Feb. 17, 1970  A. FREIMANIS  3,495,287
CLEANING APPARATUS
Filed April 18, 1966  9 Sheets-Sheet 1

INVENTOR.
AUGUST FREIMANIS
BY James E. Fralick
ATTORNEY

INVENTOR.
AUGUST FREIMANIS
BY James E. Fralick
ATTORNEY

Feb. 17, 1970 A. FREIMANIS 3,495,287
CLEANING APPARATUS
Filed April 18, 1966 9 Sheets-Sheet 3
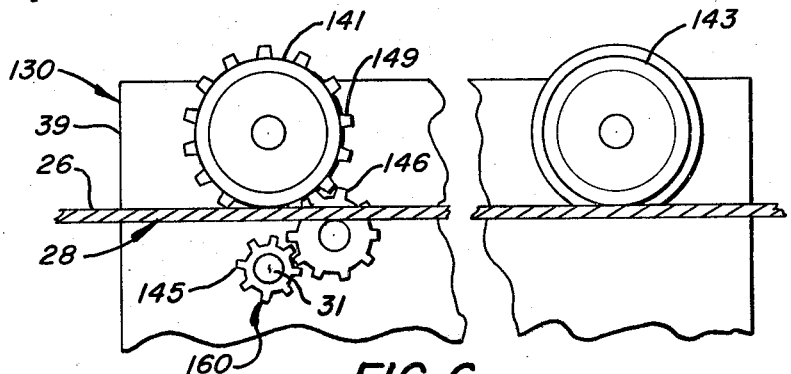
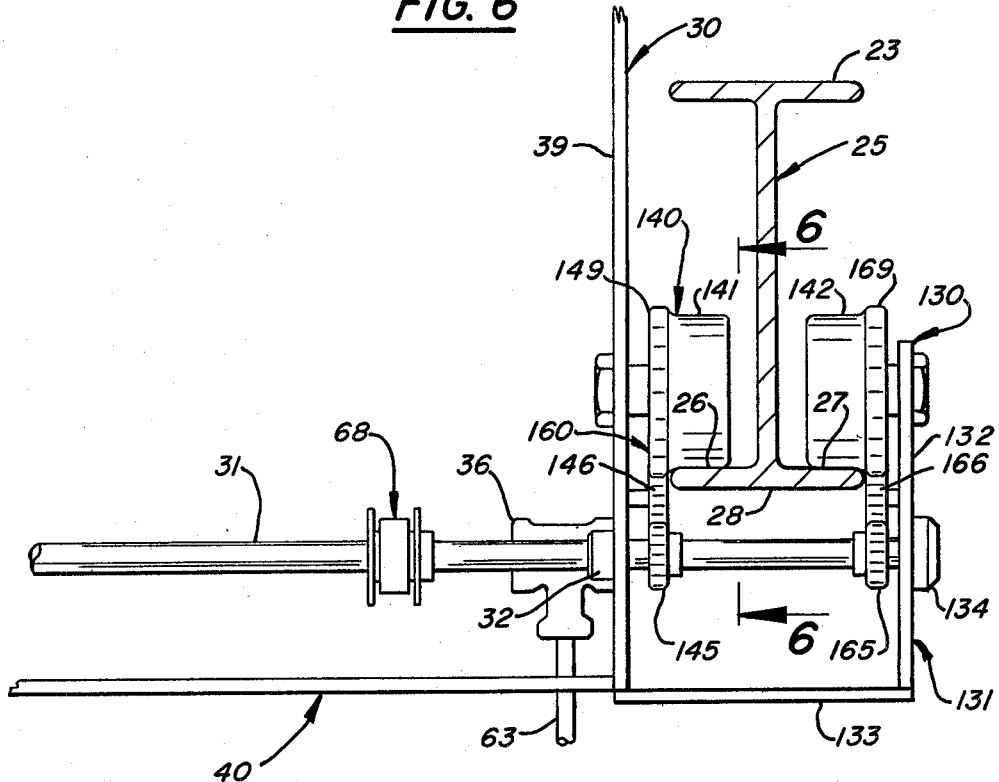
INVENTOR.
AUGUST FREIMANIS
BY James E. Fralick
ATTORNEY INVENTOR.
AUGUST FREIMANIS
BY James E. Fralick
ATTORNEY Feb. 17, 1970          A. FREIMANIS          3,495,287

CLEANING APPARATUS

Filed April 18, 1966          9 Sheets-Sheet 6

INVENTOR.
AUGUST FREIMANIS
BY *James E. Fralick*
ATTORNEY

| CAM | CONTACT | SPRING | FUNCTION | PROGRAM | PULSE 1 WASH | 2 RINSE | 3 WAX | 4 DRY | 5 OFF RESET | 1 |
|---|---|---|---|---|---|---|---|---|---|---|
| 266 | 276 | 286 | DRY AIR | | | | | 313 | | |
| 265 | 275 | 285 | WATER | | 305 | | 311 | | | |
| 264 | 274 | 284 | WAX | | | | 310 | | | |
| 263 | 273 | 283 | DETERGENT | | 304 | 306 | | | | |
| 262 | 272 | 282 | DRIVE ENERGY | 301 | 307 | 308 | | 314 | | |
| 261 | 271 | 281 | PROGRAM ADVANCE | 302 | 303 | 309 | | 312 | 315  316 | |

*FIG. 15*

# United States Patent Office

3,495,287
Patented Feb. 17, 1970

3,495,287
CLEANING APPARATUS
August Freimanis, German Township, Clark County, Ohio
(1802 W. Hall Ave., Santa Ana, Calif. 92704)
Filed Apr. 18, 1966, Ser. No. 543,244
Int. Cl. B60s 1/00
U.S. Cl. 15—21                                    23 Claims

ABSTRACT OF THE DISCLOSURE

An apparatus for cleaning a movable object, in stationary condition. The apparatus comprises a mobile frame, trolley-suspended from a fixed track, positioned peripherally above a predefined cleaning area. The mobile frame carries opposite lateral brushes, rotatable about horizontally movable, vertical axes; and a transverse brush, rotatable about a vertically movable axis. All such brushes are simultaneously rotated, and the frame is propelled reciprocally upon the track; by a driving motor carried by the frame. Fluid jet nozzles, associated with each brush, are arranged for pressure discharge of selectable fluids, in the form of an extruded film having a relatively long and thin cross-sectional configuration, into impact with adjacent surfaces of an object, positioned in the cleaning area. Impact of the fluid film causes a reactionary force to be transmitted, through the extruding nozzle and brush journals, to the transverse brush; so as to bias the brush away from the surface of the object. The transverse brush is so counterbalanced that the resultant of gravitational forces, the reactionary force, and the counterbalancing force operate to maintain the brush in contact with display surfaces of the object; at a substantially uniform, preselectable biasing force, regardless of the proximity of the surface to the axis of motion of the mobile frame. The lateral brushes are similarly counterbalanced. Various pressurized fluid materials are arranged to be selectively supplied to the jet nozzles. An electrical programming circuit is provided; which may be initially energized by a coin-actuated switch; and thereafter controlled by reciprocal motion of the frame upon the track, to perform a preselectable series of cleaning operations upon the object.

Summary

The invention which is disclosed herein and illustrated in the appended drawings relates generally to apparatus for treating surfaces of a stationary object. More specifically, this invention relates to apparatus for buffing and applying fluids to exterior surfaces of movable objects at rest, such as stationary vehicles and the like.

A number of devices have been developed for simultaneously cleaning outer surfaces of vehicles, such as aircraft, railroad rolling stock, buses, trucks, passenger cars, and the like. Certain of the known devices of this character are so arranged that a vehicle to be cleaned must be moved, during the cleaning process, so as to pass in close proximity to a relatively stationary cleaning apparatus; in order for the device to effectively clean longitudinal reaches of exposed vehicular surfaces. Such movement of a vehicle, during periods when the vehicle is under control of the cleaning agency, is attended by risk of liability for injury which might occur to the vehicle.

In other known devices of this character the apparatus, required for movement of a vehicle during a cleaning operation, is commonly so arranged that it serves to obstruct the floor area of a vehicular cleaning bay. Such obstruction impedes pedestrian mobility in the vicinity of cleaning devices of this character, thus impairing the operating efficiency of such devices.

Known devices of this character are commonly provided with fluid discharge means, which operates to broadcast heated water and cleaning fluids in the form of a spray, comprising finely divided drops. In this form, the exposed area of such fluids is greatly increased; resulting in relatively rapid evaporation and consequent heat loss, prior to effective contact with vehicular surfaces.

Tests have demonstrated that projection of heated water and detergent solutions, in the form of a relatively continuous fluid film, minimizes premature evaporation and heat loss. Such a method of applying fluids results in more effective cleaning action per unit time. Therefore, apparatus adapted for delivering cleaning fluids, in the form of a fluid film, operates more efficiently; and thus achieves the desired cleaning result, substantially more rapidly than known apparatus for this purpose.

A further time-conserving characteristic, of the operation of a fluid film type of discharge device, is found in the mildly abrasive action of the fluid film, upon impact with a vehicular surface. Tests demonstrate that the mechanical force, exerted upon such impact, operates to dislodge insoluble and semi-soluble contaminants from the vehicular surface; more readily than the less forceful action of a conventionally divided fluid spray, which serves primarily to accomplish the relatively slower process of first dissolving relatively soluble contaminants and removing them in solution.

The abrasive action of the fluid film discharged by the apparatus of this invention has been found sufficiently forceful to dislodge surface contaminants, regardless of their solubility characteristics. However, the abrasive effect of such a film has proven in no manner deleterious to permanent finishes, commonly provided on display surfaces of vehicles.

Previous devices of this character include no means, for maintaining a predetermined spaced relationship between a scrubbing or abrading element of the apparatus and exposed surfaces of a vehicle, which is independent of the size and configuration of the object to be cleaned. As a result, the abrasive action of such devices is unreliable; under circumstances where effective cleaning action requires the scrubbing or abrading element to follow substantial variations in the contour of a vehicle, and simultaneously apply substantially uniform abrasive action upon rear deck, top and hood areas, which are characteristically disposed in several different planes.

It is further seen that known devices of this class are not provided with effective means for rapidly removing water, detergent and cleaning fluids from surfaces of a cleaned vehicle. The known provision of air blowers, characterized by relatively low impact velocity of delivered air, have proven ineffective for relatively rapid fluid removal. This is true because such devices normally accomplish their result, primarily by a time consuming evaporation process.

Experimental tests of the apparatus of this invention have demonstrated that a primarily mechanical action results from the relatively high impact velocity of a relatively thin fluid film of compressed air, which is substantially broad in expanse. Such a pressurized fluid film provides a mechanical shearing action which serves to "skin" water and cleaning liquids from the surfaces of a vehicle, substantially in liquid form. This method of drying a cleaned vehicle has proven substantially more rapid than known methods, which are characterized essentially by a process of liquid evaporation.

A further limitation of known apparatus of this general category is found in the fact that quantities of fluid residues, which are frequently subject to freezing, tend to remain in exposed conduit elements of such apparatus at times when the device is not in operation. The apparatus of this invention is so arranged and operated that exposed piping elements are purged free of freezable liquids, just prior to the termination of each operating cycle. Thus the risk of damage to the apparatus, due to freezing of contained liquids in a relatively low operating temperature environment, is greatly minimized.

Objects

One object of this invention is to provide means, for cleaning exterior surfaces of a vehicle without movement of the vehicle during the cleaning operation; characterized by total suspension from an overhead structure, wherein the underpass area is without essential obstruction to vehicular and pedestrian traffic.

A second object of the invention is to provide means for rapid application of fluid cleaning agents to exposed surfaces of a stationary vehicle, with substantially minimized incidence of evaporation prior to contact with the vehicle.

A further object of the invention is to provide means, for uniformly abrading exposed surfaces of a parked vehicle, simultaneously with successive applications of detergent, polishing and drying fluids.

Another object of this invention io provide means, for rapid application of a plurality of successively different fluids to display surfaces of a vehicle; according to a predetermined, sequentially-timed program.

A still further object of this invention is to provide means, for sequentially washing, drying, and waxing display surfaces of a stationary object in response to an actuating signal.

Still further objects and features of this invention will be apparent from the subjoined specification and claims, when they are considered together with the associated drawings.

Drawings

FIG. 5 is a view in section taken along the line 5—5 of FIG. 2, showing on an enlarged scale, certain details of the mobile frame propelling means, in association with a guiding track beam.

FIG. 6 is a view in section taken along the line 6—6 of FIG. 5.

FIG. 15 is a chart illustrating a time-sequence program for operation of an apparatus, constructed according to FIG. 1 and provided with the electrical and fluid control circuitry of FIG. 14; according to the method of operation of this invention.

Description

Figure 1:
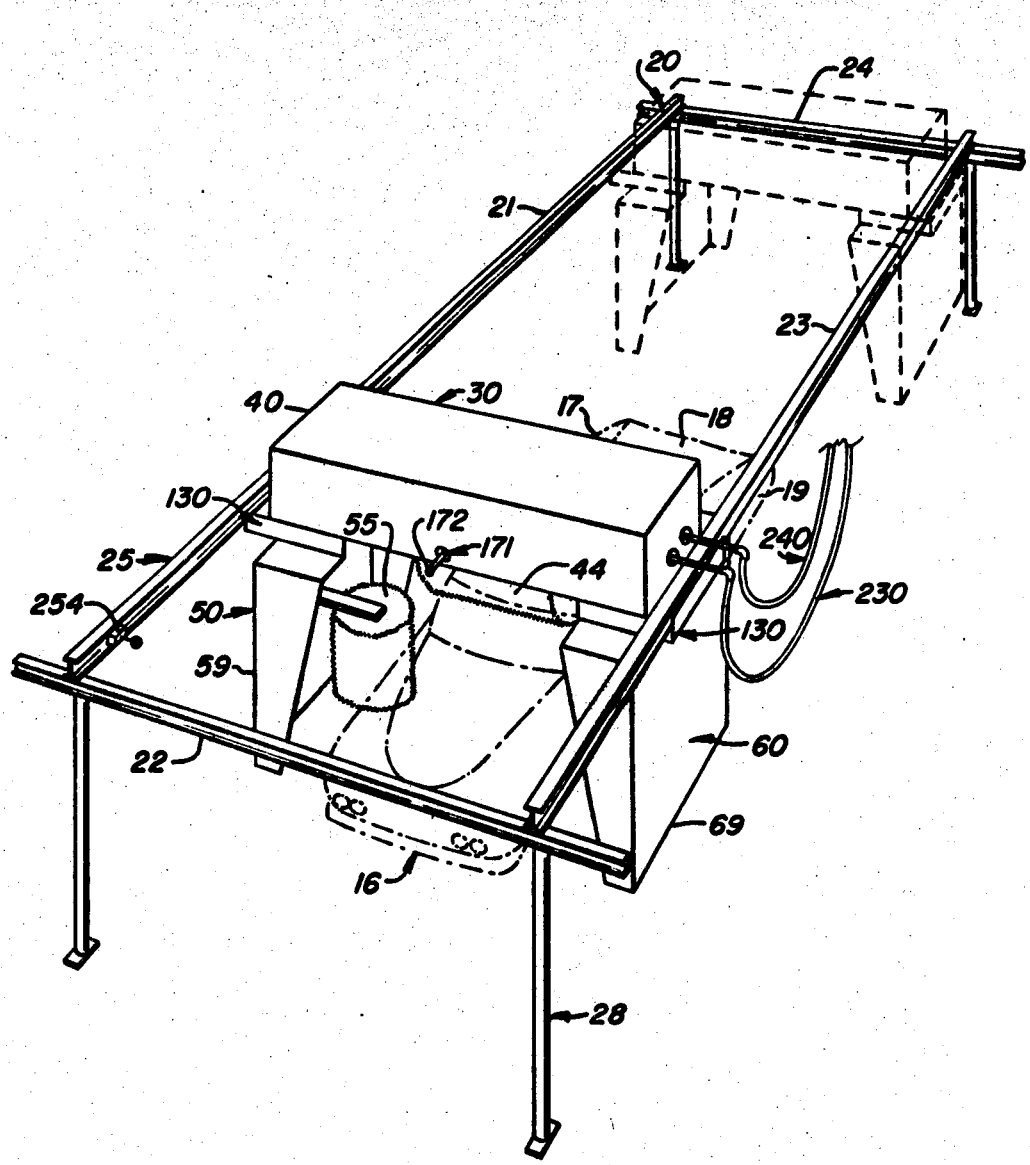
FIG. 1 is a view in perspective showing apparatus of the present invention arranged for cleaning a stationary vehicle, with the vehicle shown in dot-and-dash lines, and an alternate position of a mobile frame of the apparatus depicted in broken outline.

Briefly summarized, the present invention is seen in FIG. 1 as an apparatus, designated generally as 20, for cleaning a stationary object 16, comprising: a mobile frame 30, means 44, rotatable about a movable axis 41 (FIG. 12), for frictionally engaging object 16; means 70 (FIG. 8), carried by frame 30, for retractably suspending engaging means 44 from frame 30; means 80 (FIG. 7), located upon frame 30, for displacing axis 41 between extended and retracted positions; means 180 (FIG. 8), for rotating engaging means 44 about axis 41; means, comprising a fluid discharge head 110 carried by suspending means 70, for maintaining axis 41 in predeterminable spaced relationship with object 16, at times when engaging means 44 is located adjacent object 16; and means 130 (FIG. 2), for moving frame 30 transversely of object 16.

Referring specifically to the several figures of the drawings for a detailed description of the apparatus of the invention, it will be seen in FIG. 1 that mobile frame 30 comprises a frame portion 40, arranged with a substantially horizontal configuration; and vertical frame portions 59 and 69, suspended from opposite ends of frame portion 40. A drive shaft 31 (FIG. 2) is preferably arranged longitudinally of horizontal portion 40 of mobile frame 30. Shaft 31 is journaled in suitable bearings 32, provided in opposite end portions of horizontal frame 40.

Means, for rotatably driving shaft 31, comprises a suitable motor 33. A variety of motor means, suitable for driving shaft 31, are presently available. However, experimental operation of the apparatus of this invention suggests that motor means 33 is preferably driven by a fluid source of energy; such as a pneumatic or hydraulic energy source, for example.

When fluid motor means is thus provided, it will be apparent that all electrical current-carrying elements may be eliminated from frame 30 of the apparatus. Thus the hazard of electrical shock to users of the apparatus, at times when such use is not supervised by persons familiar therewith, is eliminated from the structural combination of the invention.

Motor 33 is preferably connected in driving relationship with shaft 31, by a suitable speed-reducing torque transmission device 34. Motor 33 may, if desired, be coupled directly to the input shaft of transmission 34, by a suitable torque coupling 38. The torque power output of motor 33 and associated transmission means 34 should be sufficient for simultaneously driving all elements of the apparatus of the invention, as described hereafter.

Means is provided, upon frame 30, for frictionally engaging an exterior surface 18 of vehicle 16. Such means comprises a horizontally disposed brush 44, which is preferably arranged in retractably suspended relationship with horizontal frame portion 40 (FIG. 8) of mobile frame 30. Brush 44 is rotatable about an axis 41; which is movable, by means described hereafter, between an extended operating position, relatively remote from frame 40, and a retracted, inoperative position, more proximate frame 40, as indicated by dot-and-dash outline in FIG. 12.

Brush 44 is preferably connected to frame 40 by a plurality of articulated link devices 70 (FIG. 8); which are arranged, in complementary configuration, adjacent the opposite ends of axial shaft 41 of brush 44. Each suspension means 70 preferably comprises upper and lower links 71 and 75, and upper and lower auxiliary links 78 and 79; in further combination with associated elements, arranged substantially in the manner illustrated in FIGS. 7 and 8 and described hereafter.

Upper link 71 is preferably journaled, by a suitable upper bearing 72 (FIG. 7), upon drive shaft 31 of horizontal frame 40. The lower portion of link 71 is similarly journaled, by a bearing 73, upon intermediate idler shaft 42. Lower link 75 is journaled by bearing 76 upon idler shaft 42. Bearing 77, located adjacent the lower end of link 75, carries axial shaft 41 of horizontal brush 44 in rotatable relationship with arm 75.

Upper auxiliary link 78 is pivotally secured, adjacent its upper end, to a suitable pivot 85 (FIG. 8), located upon frame 40; and is journaled adjacent its lower end upon pivot shaft 43. The effective distance, between the axes of upper pivot 85 and the lower bearing bore of auxiliary link 78, is substantially equal to the corresponding span between the pivotal axes of bearings 72 and 73 of upper link 71.

Figure 7:
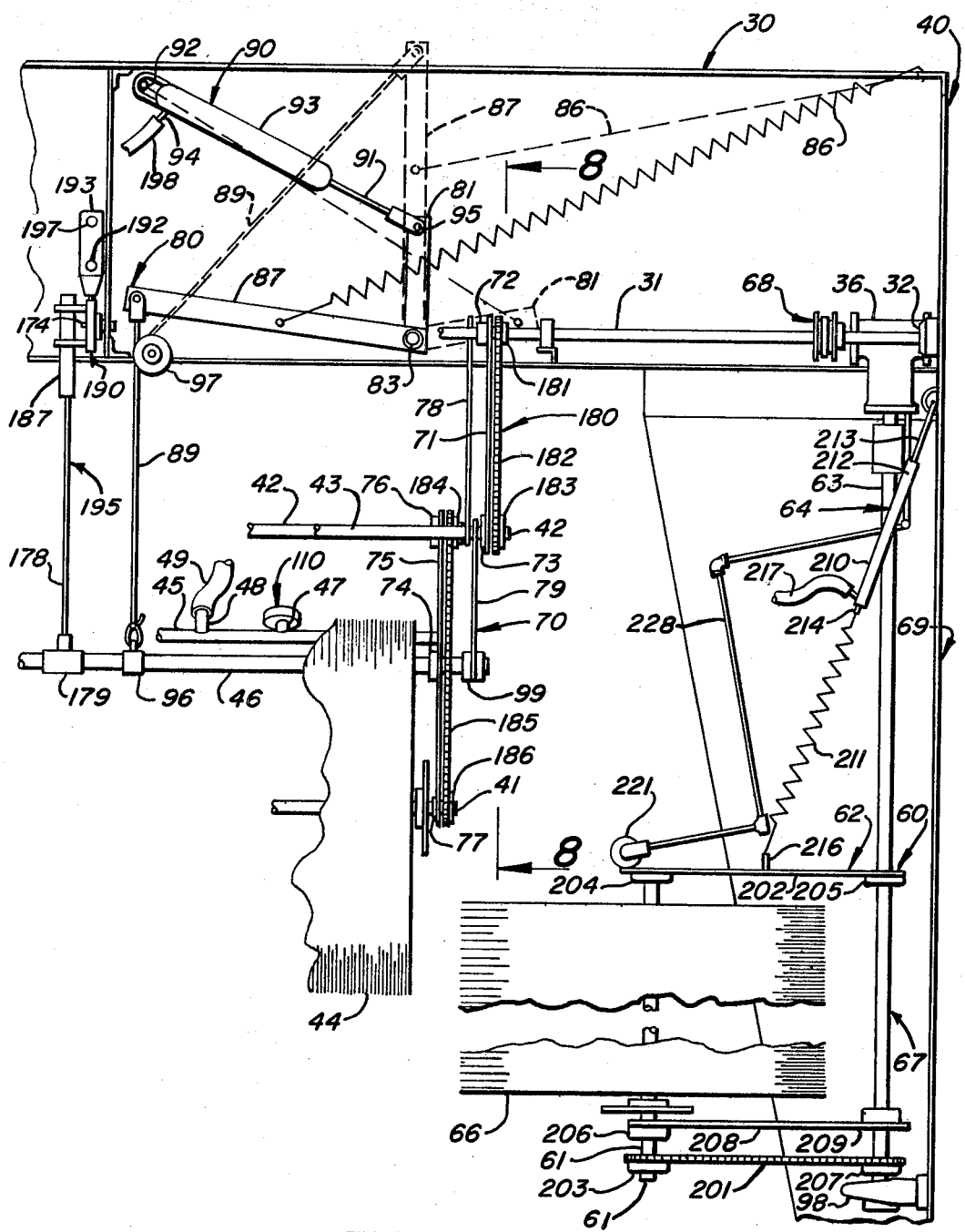
FIG. 7 is a fragmentary front plan view, showing the driving relationship between elements carried by the mobile frame; the propelling means, detailed in FIGS. 5 and 6, being omitted from the view.

Lower auxiliary link 79 is provided with a suitable bearing bore, located adjacent its upper end, for pivotally containing pivot shaft 43 (FIG. 7). The lower portion of auxiliary link 79 is provided with a bearing 99, which is suitable for pivotally connecting auxiliary link 79 to the tie shaft 46.

Shaft 46 extends transversely of and is preferably rigidly secured to oppositely disposed lower links 75, by a suitable collar 74 located upon a transverse axis of link 75; said transverse axis being spaced, from the axis of bearing 76, by a distance substantially equal to the span between the upper and lower pivotal axes of auxiliary link 79.

A second extensible link device (not shown) is formed with a general configuration substantially similar to that of link means 70, described above and depicted in FIGS. 7 and 8. The second link device is arranged in complementary alignment with means 70 of FIG. 7, and is similarly journaled upon oppositely disposed end portions of drive shaft 31, idler shaft 42, and pivot shaft 43. The opposite end of tie shaft 46 may be rigidly secured to the lower link of the second link device 70 and the upper end portion of the upper auxiliary link is pivotally secured to frame 40, substantially in the manner shown and described in reference to the link device 70 of FIGS. 7 and 8.

Figure 2:
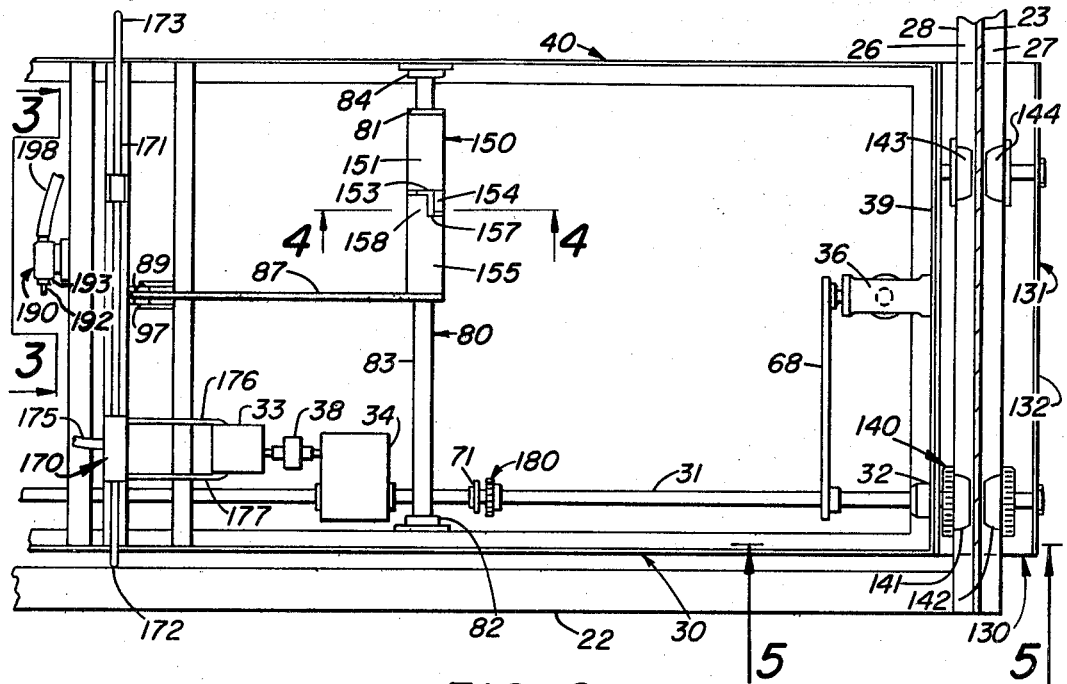
FIG. 2 is a top plan view, in enlarged scale, showing the mobile frame mounted for guided motion upon the track beam of FIG. 1; portions of the mobile frame, frame housing and track beam being omitted for clarity.

Means, for displacing the rotational axis 41 of brush 44 to a position remote from vehicle 16 (FIG. 12), comprises the brush elevator apparatus, designated generally as 80 in the top plan view of FIG. 2 and the front plan view of FIG. 7. Brush displacing means 80 comprises elevator shaft 83, carried by frame 40; lift arm 81, pivotally secured to shaft 83 and in radial disposition therewith; lever arm 87, pivotally secured to shaft 83, in radial disposition therewith and in spaced-apart relationship with arm 81; and means, comprising clutch 150 interconnecting arms 81 and 87 for limited independent rotation thereof, at times, and for concurrent rotation thereof to retracted positions, at other times when desired. Elevator apparatus 80 is arranged substantially in the manner illustrated in the drawings and described hereafter.

Elevator shaft 83 is secured, by suitable means, to horizontal frame 40. It will be apparent that shaft 83 may be journaled in oppositely disposed flange bearings 82 and 84 (FIG. 2), provided upon longitudinal frame members of frame 40, if desired. When shaft 83 is thus journaled upon frame 40, one of arms 81 and 87 may, if desired, be secured to shaft 83 so as to rotate therewith.

Lift arm 81 is preferably journaled upon shaft 83, so as to project radially from the shaft and to be rotatable about the axis of shaft 83 (FIG. 7). Lever arm 87 is similarly arranged upon shaft 83 is spaced-apart relationship with arm 81 (FIG. 2).

Clutch means 150 preferably comprises cooperating sleeve elements 151 and 155, formed with axial bearing bores 152 and 156 (FIG. 4), suitable for journaling elements 151 and 155 of clutch 150 upon elevator shaft 83; so as to permit individual rotation of elements 151 and 155 about the axis of shaft 83.

Lift sleeve 151 is further formed with a terminal face 153. A lift sector portion 154 projects from face 153, so as to form oppositely disposed stop surfaces 161 and 162; which are preferably located in radial planes of sleeve 151 and in angular disposition with terminal face 153.

Lever sleeve 155 is formed with a terminal face 157 (FIG. 2) and a sector portion 158, arranged to project from face 157, substantially parallel with the axis of sleeve 155. Lever sector 158 is formed with radially disposed stop faces 163 and 164 (FIG. 4) arranged in angular conjunction with face 157 (FIG. 2). Sector 158 preferably extends substantially throughout an arc not greater than 90°, disposed about the axis of sleeve 155 (FIG. 4).

Figure 4:
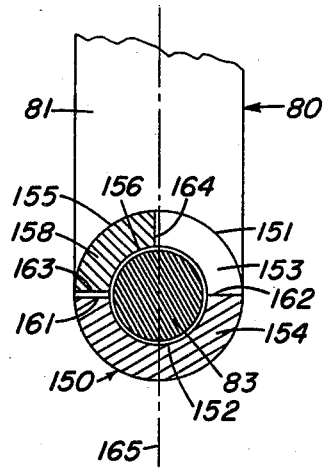
FIG. 4 is a view in enlarged, fragmentary section, taken along the line 4—4 of FIG. 2.

Oppositely disposed stop faces 163 and 164 are thus interconnected by terminal face 157 (FIG. 2), which extends through an arc, preferably not less than 270°, circumscribed about the axis of bore 156 of lever sleeve 155 (FIG. 4). Lever sleeve sector 158 projects from terminal face 157 by a distance not greater than the projecting dimension of sector portion 154 of lift sleeve 151 (FIG. 2).

Lift 81 is preferably secured in radial projection with the outer end of lift sleeve 151 of clutch 150, so as to be rotatable with sleeve 151 about the axis of the shaft 83. Lever arm 87 is similarly secured to the outer end of lever sleeve 155, for rotation therewith about the axis of shaft 83.

Lift arm 81 is preferably arranged, upon sleeve 151, so that oppositely disposed stop faces 161 and 162 of sleeve 151 (FIG. 4) are positioned in a substantially horizontal plane of the axis of shaft 83, at times when arm 81 is in the vertical position of FIGS. 2 and 4. Lever arm 87 is preferably so positioned upon sleeve 155 that stop face 163 (FIG. 4) of lever sector 158 lies adjacent stop face 161 of lift sleeve 151, at times when lever arm 87 is in the substantially horizontal position of FIG. 2.

Thus, when arms 81 and 87 are arranged in the relative positions of FIG. 2, independent rotation of lever arm 87 and sleeve 155, in a counterclockwise direction as viewed in FIG. 4, will be limited by interengagement of stop face 161 of lift sleeve 151 and stop 163 of lever sleeve 155. It is further apparent, however, that when lift arm 81 and interconnected sleeve 151 are retained in the substantially vertical position of FIG. 4; lever arm 87 and the interconnected sleeve 155 are reciprocably rotatable about the axis of shaft 83, throughout an arc of the order of 90°.

A suitable lift cable 89 (FIG. 7) is pivotally secured to tie shaft 46 of suspending means 70, by sleeve connector 96, which is preferably rotatable upon shaft 46. Cable 89 may, if desired, be carried by a suitable guide pulley 97, journaled upon frame 40. The upper end of cable 89 is pivotally secured adjacent the radially projecting end of lever arm 87.

One end of a suitable tension spring 86 is connected to lever arm 87, at a position intermediate cable 89 and elevator shaft 83 (FIG. 7). The upper end of tension spring 86 is preferably secured to mobile frame 40. Tension spring 86 provides an upwardly directed bias, which is sufficient for resiliently supporting brush 44 and interconnected suspension means 70, at times when lever arm 87 is in the substantially horizontal position, and spring 86 is in the relatively stressed configuration; substantially as shown in the solid line rendering of FIG. 7.

Means, comprising fluid piston motor 90 (FIG. 7), for at times rotating lift arm 81 and lever 87 about the pivotal axis of shaft 83; comprises a suitable fluid motor, which is preferably of the reciprocable piston type. Motor 90 is provided with a cylinder portion 93, containing a reciprocable piston attached to a connecting rod 91. Motor 90 is pivotally secured, by suitable pivot means 92 (FIG. 7), to frame 40 of mobile frame 30. Connecting rod 91, carried by the piston element of motor 90, is pivotally secured, by a suitable pin 95, adjacent the radially disposed end of lift arm 81.

Motor 90 is so arranged that introduction of a fluid, under differential pressure, through inlet port 94 into cylinder 93, operates to drive the contained piston, and attached connecting rod 91, outwardly along a radius of the axis of pivot 92. When motor 90 is thus energized, connection rod 91 rotates lift arm 81 to the substantially horizontal, retracted position shown in broken lines in FIG. 7.

Rotation of lift arm 81 to the retracted position operates to rotate lift sleeve 151, of clutch 150, in a clockwise direction in FIG. 4, about the axis of shaft 83; so as to reposition stop faces 161 and 162 substantially within a vertical plane of shaft 83, designated by the numeral 165 in FIG. 4. Thus it is seen that rotation of arm 81, to the retracted position of FIG. 7, operates to inter-engage face 161 of lift sector 154 and face 163 of lever sector 158 (FIG. 4); and to rotate sleeve 155 and the interconnected lever arm 87, about the axis of shaft 83, to the substantially vertical position of lever 87, which is indicated by broken outline in FIG. 7.

When lever 87 is thus rotated to the retracted position; cable 89 is drawn upwardly upon guide pulley 97. Lever 87 and cable 89 thus cooperate to elevate tie shaft 46, of suspending means 70 (FIG. 7); so as to draw brush 44 toward the substantially retracted position seen in the dot-and-dash outline of FIG. 12.

When arms 81 and 87 are thus in their respective retracted positions, and lift motor 90 is de-energized by releasing the internal fluid pressure within cylinder 93; the bias, exerted by tension spring 86 in its relatively unstressed condition, is insufficient to resist the gravitational force, exerted by brush 44 and oppositely disposed suspension means 70, upon cable 89 and the interconnected lever arm 87. Therefore, de-energization of motor 90 results in gravitational motion of brush 44 toward the downwardly extended operating position of FIG. 7.

As brush 44 approaches its position of maximum extension, lever arm 87 is drawn toward its substantially horizontal, extended position; and tension spring 86 is drawn, by arm 87, to a relatively stressed configuration, wherein the upward bias of spring 86 is in equilibrium with the opposing gravitational force of brush 44 and suspension means 70, which is exerted upon spring 86 through cable 89 and lever arm 87.

It will be understood that any desired portion of the upward biasing force, which is required to establish an equilibrium condition between spring 86 and the effective gravitational force of brush 44 and related suspensory linkage, may be provided by one or more shock absorbing devices of well-known configuration. Such devices may be arranged intermediate superposed frame 30 and brush suspending means 70, so as to minimize lateral deviation of means 70 and brush 44 from a substantially vertical path of retraction and suspension; without departing from the disclosure of this invention.

Figure 8:
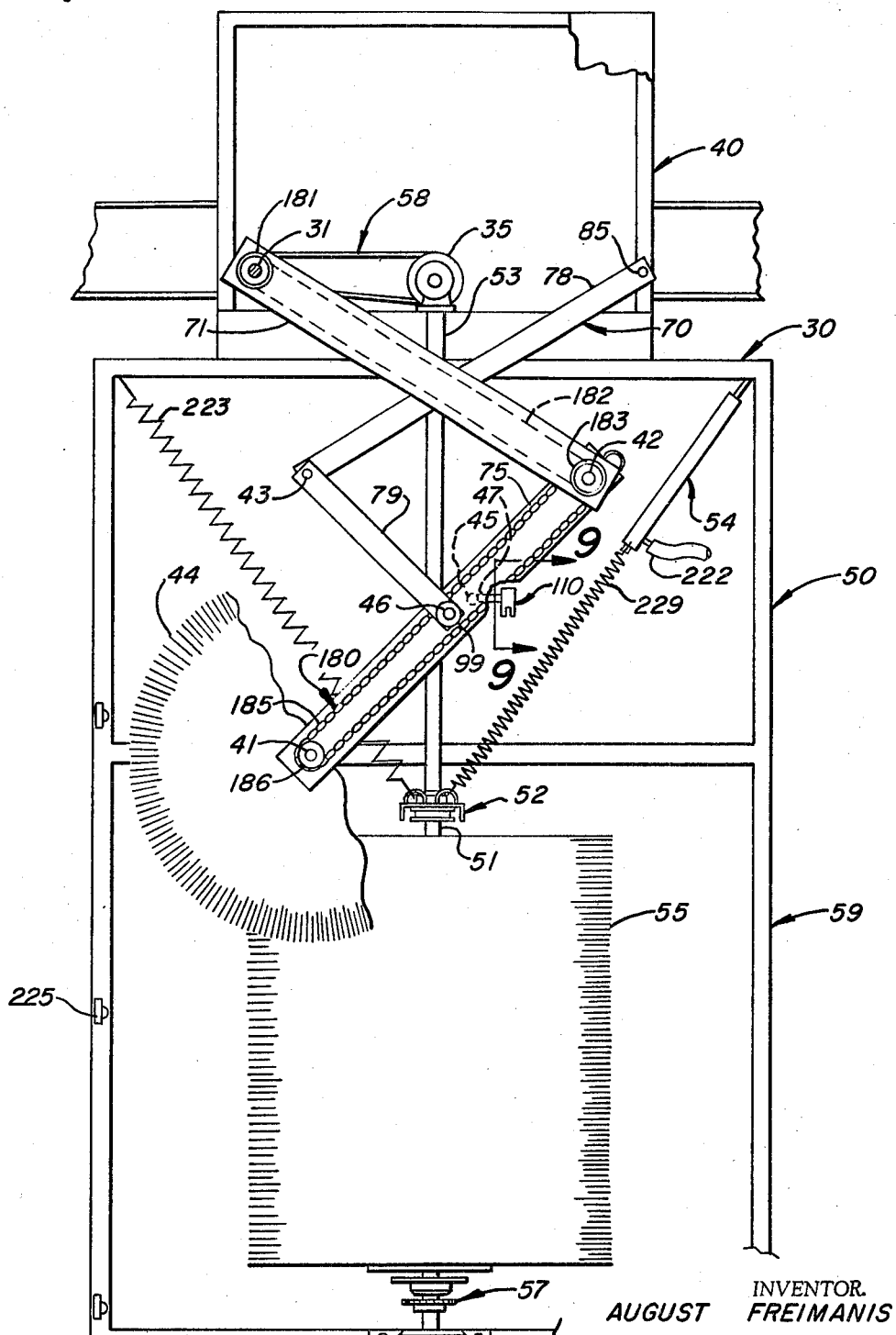
FIG. 8 is a fragmentary view in vertical cross-section, taken along the line 8—8 of FIG. 7.
Figure 11:
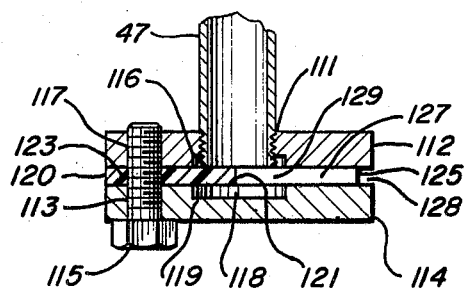
FIG. 11 is a view in section, taken along the line 11—11 of FIG. 9.
Figure 9:
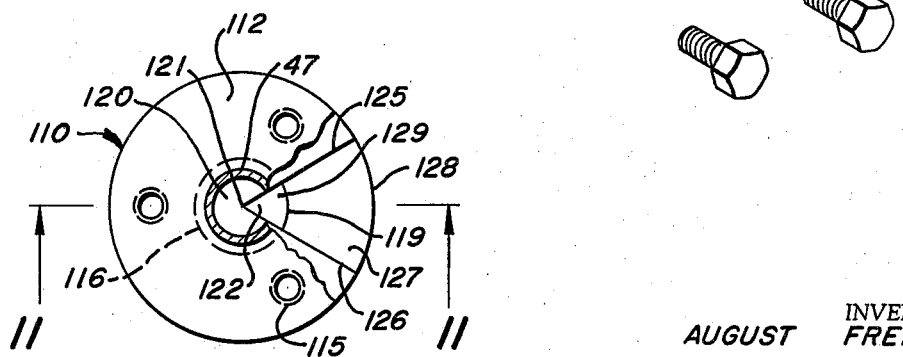
FIG. 9 is a view in enlarged section, taken along the line 9—9 of FIG. 8, showing structural detail of a fluid discharge head constructed according to the invention.

Means, for maintaining axis 41 of brush 44 in predetermined spaced relationship with surface 18 of vehicle 16 (FIG. 12), at times when desired; comprises a fluid discharge device, designated generally as 110 in FIG. 8. Discharge head 110 preferably comprises a base portion 112 (FIG. 10), an interval-spacing diaphragm 120, and a cap portion 114; in combination with related structural elements, arranged substantially as shown in FIGS. 9, 10, and 11, and described more particularly hereafter.

Figure 10:
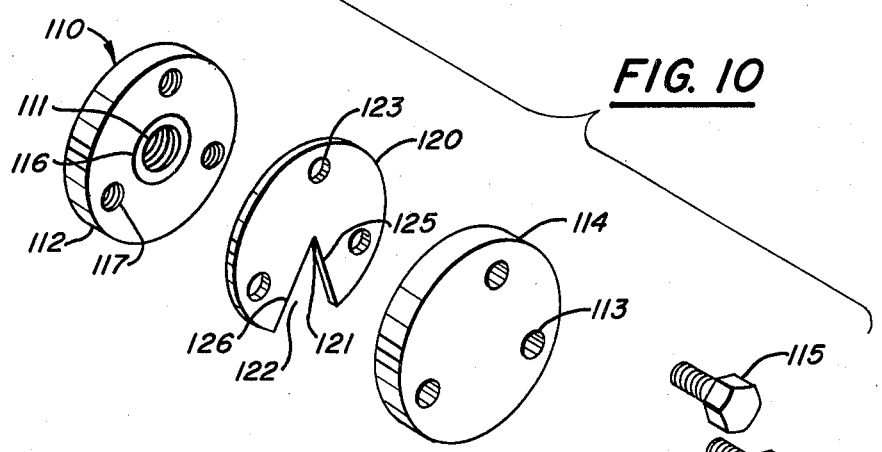
FIG. 10 is a view in exploded perspective, illustrating the preferred configuration of structural elements comprising the discharge head of FIG. 9.

Base 112 of discharge head 110 is preferably formed with the substantially cylindrical configuration shown in the exploded perspective view of FIG. 10. A tapped, axial inlet bore 111 extends through base plate 112 and communicates with opposite plane surfaces thereof. Counterbore 116, formed coaxially with inlet bore 111 in base plate 112, has a diameter greater than the major thread diameter of tapped bore 111. Base plate 112 is further provided with a plurality of tapped bores 117, located upon axes paralleling that of bore 111 and radially disposed about counterbore 116.

Interval-spacing diaphram 120 is preferably formed with the circular plan configuration illustrated in FIG. 10. Diaphragm 120 is formed from a suitable resilient material. Experimental tests indicate that a plastic film material, having sufficient resilience to be deformable within central cavity 118, may be fabricated with the configuration of FIG. 9 to provide a satisfactory interval-spacing diaphragm 120.

Diaphragm 120 is preferably formed with an overall diameter substantially equal to that of base plate 112. Radial margins 125 and 126 of diaphragm 120 extend divergently, so as to describe an acute angle, from a common apex 121, which is arranged to be registerable with the common axis of inlet bore 111 and counterbore 116 of base plate 112.

A plurality of radially disposed bores 123 is arranged in diaphragm 120 so as to be registerable with bores 117 of base plate 112. Angular margins 125 and 126 of diaphragm 120 define a sector opening 122, located intermediate the radially disposed bores 123. Sector opening 122 is preferably greater than 60° in extent.

Cap portion 114 of fluid discharge head 110 is preferably formed with the generally cylindrical configuration shown in FIGS. 10 and 11. The plan configuration of cap 114 is substantially circular, with a diameter conforming to corresponding diameters of base 112 and diaphragm 120, as previously described. A plurality of bores 113 communicate with opposite plane surfaces of cap 114, and are registerable with bores 117 and 123 of base 112 and diaphragm 120, respectively.

The inwardly disposed plane surface of cap 114 is formed with a blind bore 119 (FIG. 11), which is arranged to be registerable in axial alignment with apex 121 of diaphragm 120 and counterbore 116 of base 112. Blind bore 119 and counterbore 116 are preferably formed with substantially equal diameter and axial dimensions; the axial dimension of each being greater than half the thickness dimension of diaphragm 120.

Suitable cap screws 115, threadbly engaged in base 112, serve to secure base 112, diaphragm 120, and cap 114 in mutual axial alignment, substantially as illustrated in FIG. 11. When thus arranged, blind bore 119 and counterbore 116 of discharge head 110 cooperate to define a central cavity 118; which is in communication with a radially extending discharge duct 127, defined by divergent margins 125 and 126, or diaphragm 120, and the inner plane surfaces of base 112 and cap 114.

Discharge duct 127 thus communicates with central cavity 118 and the circumferential surface of head 110. Duct 127 has a substantially uniform vertical dimension (as seen in FIG. 11), which is determined by the thickness dimension of diaphragm 120. Reference to the fragmentary plan view of FIG. 9 reveals duct 127 to terminate, at the outer periphery of discharge head 110, in a circumferentially disposed discharge port 128. The inner terminus of duct 127 defines a restricted throat 129, formed by angular margins 125 and 126 of diaphragm 120 and oppositely disposed annular walls of blind bore 119 and counterbore 116 (FIG. 11).

Experimental tests indicate that the arcuate area of annular discharge port 128 should be greater than twice that of restricted throat 129, to achieve optimum discharge characteristics and substantially uniform flow velocity throughout the fluid film 124 (FIG. 12) which is projected from discharge head 110 during operation of the apparatus.

Figure 12:
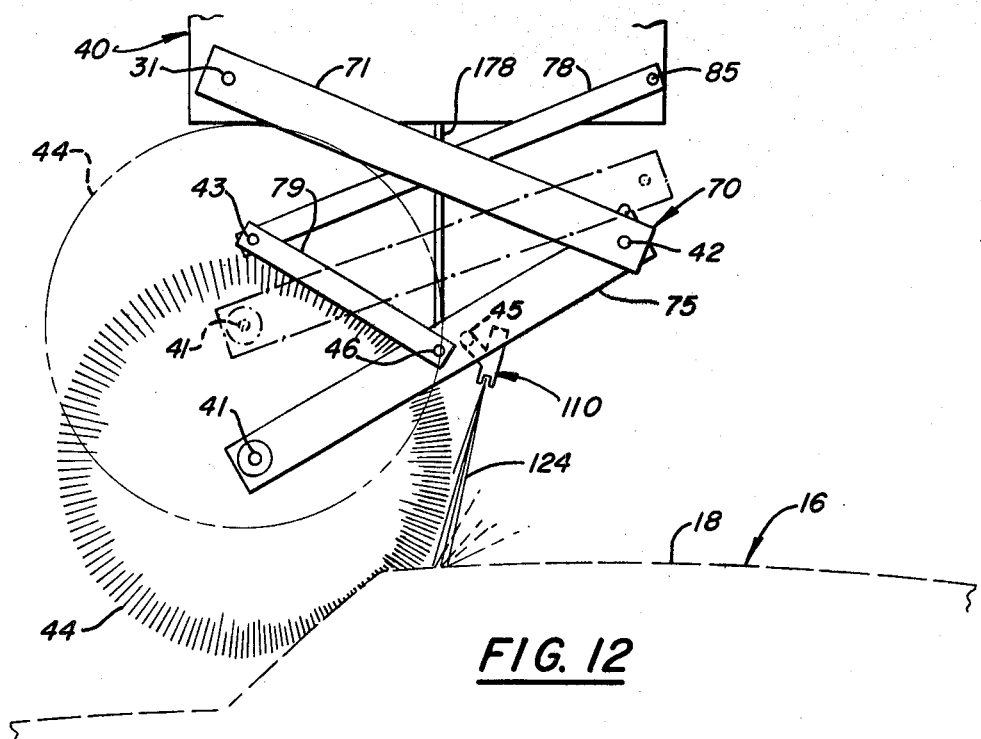
FIG. 12 is a diagrammatic illustration of the operating relationship between the horizontal brush member and the vehicle of FIG. 1; the vehicle being shown in broken outline, and a fully retracted, inoperative position of the horizontal brush and related structural elements being depicted in dot-and-dash outline.

Discharge head 110 is threadably connected to a fluid supply conduit 47, formed upon a fluid distribution manifold 45 (FIG. 7). Manifold 45 may, if desired, be provided with a plurality of supply conduits 47. Each of such conduits 47 may thus be connected to a discharge head 110, if desired. Such conduits 47, each carrying an associated head 110, are preferably spaced along manifold 45, so as to be capable of cooperating to discharge a substantially integral fluid curtain 124, which extends transversely throughout the reaches of upwardly disposed surfaces 18 of vehicle 16 (FIG. 12).

Manifold 45 is preferably formed with an input conduit 48 (FIG. 7); and is rigidly secured at its opposite ends, as by flange-welding for example, in fluid-tight engagement with the inner surfaces of opposite lower links 75 of suspending means 70.

When fluids are introduced into input conduit 48 of manifold 45, under pressure substantially in excess of atmospheric pressure; they are transmitted through manifold 45 and supply conduits 47 to central cavity 118 of discharge head 110 (FIG. 11). From cavity 118 the pressurized fluids pass through restricted throat 129 into the laterally divergent discharge duct 127; whereby the fluids are formed into the configuration of a unitary fluid jet film 124 (FIG. 12), and are extruded, through peripheral discharge port 128, at substantial velocity.

The free and unrestricted projection of fluid film 124 from port 128 of head 110, at a relatively high discharge velocity, is opposed by a proximately disposed vehicular surface 18. This opposition to projection of fluid film 124 results in transmission of a back-pressure, through fluid film 124, to discharge head 110.

The upwardly directed force, which is thus exerted, is transmitted from discharge head 110 through supply conduit 47 and manifold 45 to opposite lower links 75 of suspending means 70. The resultant force is thus applied to oposite links 75, at the points of conjunction of conduit 45 and oppositely disposed links 75, intermediate the intersections of pivot axis 42 and brush axis 41 with each suspension means 70.

Since this resultant force is directed in opposition to the effective gravitational pull of brush 44 and suspension means 70; it serves to rotate the oppositely disposed links 75 upwardly about the axis of idler shaft 42, through a rotational arc of determinable extent. The extent of rotation of links 75, in reaction to the back-pressure derived from an opposed jet film 124, is determined by the combined mass of brush 44 and suspension means 70, as effectively modified by the upward biasing force of suspension spring 86; in relation to the quantum of back-pressure exerted upon discharge head 110 as a result of the projection of jet film 124 upon a proximate vehicular surface 18.

The effective back-pressure, which is thus exerted upon head 110 is inversely proportional to the proximity of head 110 and a vehicular surface 18, which opposes the unrestricted projection of jet film 124 from discharge head 110. Axis 41 is thus rotated upwardly, in the diagram of FIG. 12, to a position wherein the reactive force of jet film 124 is in equilibrium with the effective combined gravitational pull of brush 44 and the associated suspending means 70.

It is therefore apparent that the relative operating position of axis 41, with reference to a film-opposing surface 18, is predetermined by varying the upward biasing force of the stressed spring 18 and the differential pressure at which fluids are delivered to input conduit 48 of fluid manifold 45. When these forces are thus adjusted to achieve a state of equilibrium, which results in a desired operating proximity of axis 41 and surface 18; brush 44 is thereafter maintained, by jet film 124 of discharge head 110, in substantially constant, spaced-apart relationship with all surfaces 18 of vehicle 16, which provide substantial resistance to the projection of fluid film 124 from discharge head 110.

Therefore, the reactive back-pressure, derived from the impact of jet film 124 of discharge head 110 upon a resisting surface 18, operates to maintain axis 41 of brush 44 in predetermined spaced relationship with the resisting surface 18, at times when brush 44 is located in an extended operative position, adjacent vehicle 16.

Means, for reciprocably moving frame 30 transversely of vehicle 16, comprises: means 25 (FIG. 1), for supporting frame 30 in guided relationship with vehicle 16; means, comprising trolley 130 driven by shaft 31 and arranged in frictional engagement with support means 25, for propelling frame 20 along support means 25; and means, comprising limit switch 170 (FIG. 2), connected to shaft driving means 33, for periodically reversing the direction of travel of trolley 130 along supporting means 25.

Supporting means 25 preferably comprises oppositely disposed track beams 21 and 23, in combination with suitable means, designated generally as 28 in FIG. 1, for maintaining track beams 21 and 23 in superposed relationship with respect to vehicle 16.

Track beams 21 and 23 are preferably arranged in mutually parallel configuration and spaced apart by a distance greater than the width of a vehicle 16. Beams 21 and 23 may, if desired, be maintained in superposed relationship with vehicle 16 by suitable framing means, comprising a plurality of supporting posts 28; under circumstances where the device of the present invention is erected independently of a sheltering structure.

When the apparatus of the present invention is erected as an integral component of an associated sheltering structure; oppositely disposed track beams 21 and 23 may be supported by suitable framing elements of the sheltering structure. For example, beams 21 and 23 may be suspended, by known means, from superstructure framing elements of an associated shelter. If it is preferred, beams 21 and 23 may bear upon horizontal sill members, which are commonly provided in the framing of wall portions of sheltering structures; within the spirit and scope of the present invention.

Under circumstances where track beams 21 and 23 are supported by vertically disposed posts 28, arranged independently of a sheltering structure; means, comprising transverse tie beams 22 and 24 (FIG. 1) is provided for reinforcing the structural rigidity of supporting means 25. Track beams 21 and 23 are preferably so positioned that, when mobile frame 30 is mounted upon supporting means 25 and brush 44 is in the fully extended configuration of FIG. 7, horizontal brush 44 is engageable with the lowermost of the upwardly disposed surfaces 18 of vehicle 16.

Means, for propelling frame 30 along support means 25, preferably comprises a plurality of trolley carriages 130; arranged upon opposite ends of horizontal portion 40 of frame 30. Each of carriages 130 is adapted for frictionally engaging a laterally projecting flange portion of a track beam, such as upper surfaces 26 and 27 of flange 28 of a track beam 23, for example, as shown in FIG. 2.

Carriage 130 preferably comprises: a truck frame, designated generally as 131, which is formed integrally with horizontal portion 40 of mobile frame 30; a plurality of friction pulleys 140, pivotally mounted upon frames 40 and 131; and means, comprising gear train 160 (FIG. 5), connecting pulley wheels 140 in driven engagement with shaft 31, for frictionally propelling trolley carriages 130 and mobile frame 30 longitudinally of supporting track means 25.

Truck frame 131 is preferably formed with an anchor plate 132, arranged sustantially parallel to the proximate wall of horizontal frame 40. Anchor plate 132 is rigidly secured in spaced-apart relationship with horizontal frame 40 by a suitable spacing plate 133. If desired, driving shaft 31 of mobile frame 30, previously described, may be journaled at its outer termini in suitable bearings 134, which are carried by oppositely disposed anchor plates 132 of frame 131.

A plurality of friction pulleys 140, comprising pulleys 141 and 142 (FIG. 5) is pivotally secured, by suitable stud-mounted bearings, upon each end wall 39 of mobile frame 30, and anchor plate 132, respectively.

Suitable gears 145 and 165 are secured upon driving shaft 31, within the confines of truck frame 131. An idler gear 146 is preferably arranged in meshed engagement with driving gear 145, of shaft 31, and with a flange gear 149, formed upon a circumferential flange of driving pulley 141 (FIG. 6). Idler gear 146 is rotatably secured, by a suitable stud-mounted bearing, to end wall 39 of frame 30. A second idler gear 166 (FIG. 5) may, if desired, be similarly secured in stud-mounted relationship with anchor plate 132, and arranged in meshed engagement with driving gear 165 and flange gear 169 of friction drive pulley 142.

Thus it is seen that gears 145, 146, and 149 comprise a gear train 160, connecting pulley wheel 141 in driven engagement with shaft 31 (FIG. 6). Similarly, gears 165, 166 and 169 (FIG. 5) cooperate to connect pulley 142 in simultaneously driven relationship with shaft 31 and pulley 141. Thus trolley carriage means 130 operates to propel mobile frame 30 longitudinally of track means 25, in response to rotational motion of driving shaft 31 of frame 30.

A stabilizing idler pulley 143 is preferably arranged for frictional engagement with upwardly disposed track 26 of flange 28, located upon track beam 23 as seen in FIG. 6. Idler pulley 143 is rotatably secured, in stud-mounted relationship with end wall 39 of mobile frame 30. If desired, a second idler pulley 144 (FIG. 2) may be similarly arranged; in rotatable, stud-mounted relationship with anchor plate 132, so as to be engageable with upper flange surface 27 of track beam 23.

Means, for periodically reversing the direction of movement of trolley means 130 upon track means 25, preferably comprises a suitable selector type of limit switch 170 (FIG. 2); which is carried by mobile frame 30. Energy input conduit 175 of limit switch 170 is preferably connected to a source of energy, suitable for driving a motor 33 substantially in the manner previously described. Output conduits 176 and 177, provided in limit switch 170, are connected to driving motor 33.

Limit switch 170 is adapted for selectively channeling energy, derived from input conduit 175, to alternately selectable internal driving circuits of motor 33; in response to relative positioning of a longitudinally disposed limit probe 171, substantially in the manner described hereafter.

For example, when it is desired to drive motor 33 from a source of actuating energy, such as compressed air derived from supply conduit 175, limit switch 170 may comprise suitable valve means, of known configuration; whereby compressed air derived from conduit 175 is channeled through conduit 176 to motor 33, for rotatably driving shaft 31 in a clockwise direction (as seen in FIG. 6), at times when forward terminus 172 of limit probe 171 is located in the position of FIG. 2, relatively adjacent switch 170.

When limit probe 171 is re-positioned longitudinally of switch 170, to an extended position wherein forward terminus 172 is more remote from switch 170 than the position of FIG. 2; compressed air from conduit 175 is channeled, by valve 170, through conduit 177, for driving motor 33 so as to rotate shaft 31 in the counterclockwise mode as seen in FIG. 6.

Means 180, for rotatably driving brush 44, preferably comprises a plurality of sprockets 181, 183, 184 and 186; which are interconnected by suitable drive chains 182 and 185 (FIGS. 7 and 8). Sprocket 181 is secured to shaft 31 of mobile frame 30 for rotation therewith. Sprocket 186 is secured adjacent the outer terminus of axial shaft 41, of horizontal brush 44, so as to rotate with shaft 41.

Sprockets 183 and 184 are arranged in substantially vertical alignment with sprocket 181 of shaft 31 and sprocket 186 of shaft 41, respectively; and are secured for rotation with idler shaft 42 of suspension means 70.

Chain 182 thus connects drive sprocket 181 in driving engagement with sprocket 183, idler shaft 42 and driving sprocket 184. Brush chain 185 connects brush sprocket 186 in driven engagement with driving sprocket 184, idler shaft 42 and driven sprocket 183. It is thus apparent that chains 182 and 185 connect brush 44, carried by axial shaft 41, in articulated, driven engagement with shaft 31 of mobile frame 30.

Means 190 (FIG. 7) is provided, for removing horizontal brush 44 from a position of frictional engagement with vehicular surface 18 to the retracted position of FIG. 12; at times when movement of brush 44, transversely of vehicle 16, is resisted by an opposing force of unusual magnitude. Means 190 preferably comprises a suitable fluid distributing valve 193 (FIG. 3), in combination with means 195, for actuating valve 193 in response to substantial dislocation of the axis of shaft 46 from the vertical plane of normal reciprocal motion.

Valve 193 preferably comprises a mechanically actuated fluid distributing valve, formed with primary ports 192 and 197 and secondary port 196. Valve 193 is further provided with an actuating piston, designated by the numeral 191 in FIGS. 3 and 14. Piston 191 of valve 193 is reciprocably movable, longitudinally of valve 193.

Figure 14:
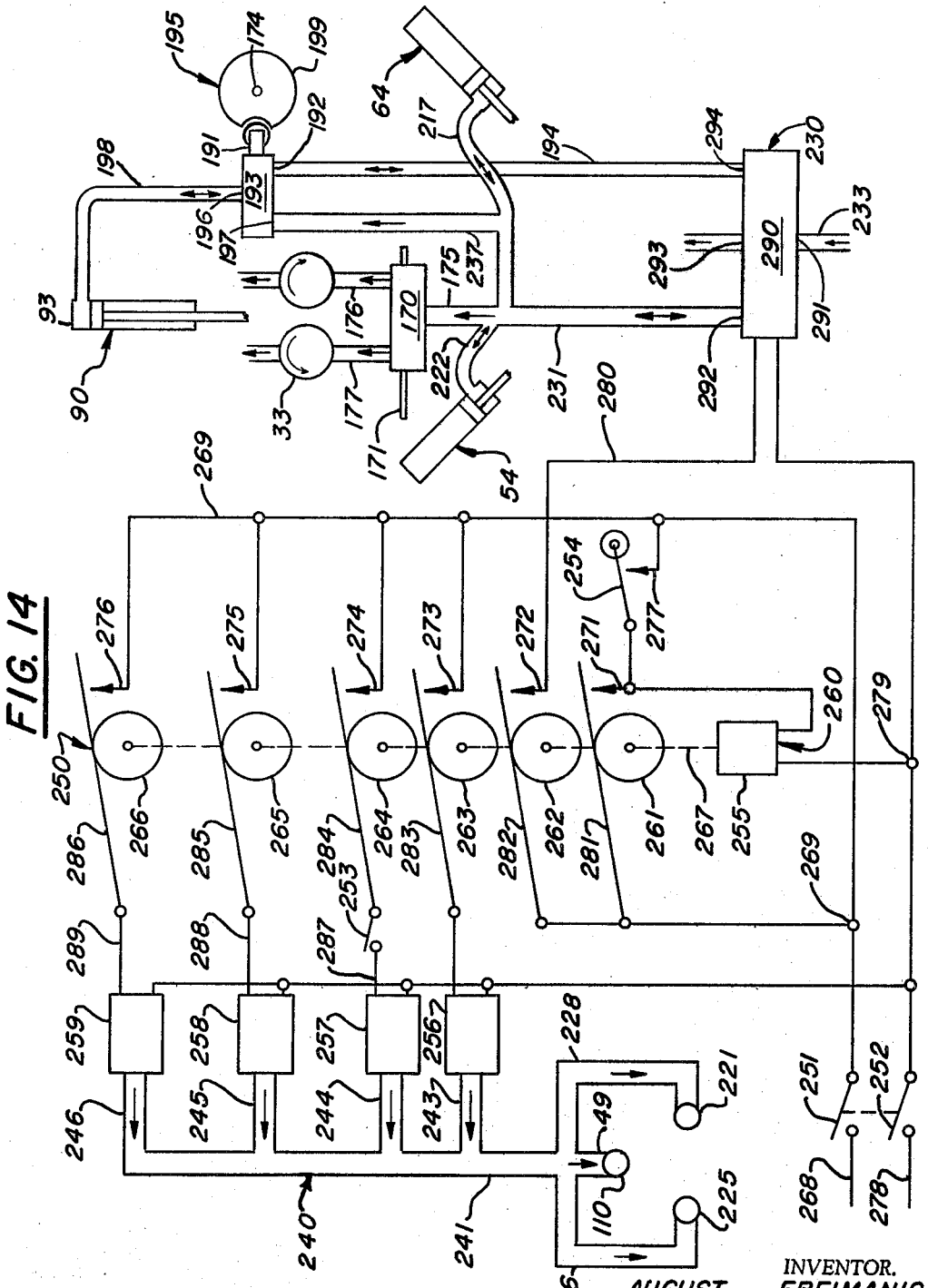
FIG. 14 is a schematic circuit diagram, illustrating electrical circuit means for controlling the operation of fluid circuit elements, of the apparatus of the invention, according to the method of this invention.

When piston 191 is in the normally biased, extended configuration of FIG. 14; cylinder 93 of motor 90 is connected by conduit 198, valve 193 and conduit 194, in fluid communication with secondary port 294 of motor energizing valve 290. When piston 191 of valve 193 is mechanically relocated to the contained configuration of FIG. 3; primary port 192 is closed, and ports 196 and 197 are interconnected, so as to connect cylinder 93 in fluid communication with motor energy manifold 231, through conduits 198 and 237.

Means 195, for actuating valve 193, preferably comprises a cam 199 (FIG. 3); in combination with means 189, for rotating cam 199 is response to a predetermined quantum of horizontal motion of axis 41 relative to frame portion 40 of mobile frame 30. Cam 199 is rotatably secured to frame 40 by axial stud 174 (FIG. 14); with the periphery lying adjacent the outer terminus of piston rod 191 of valve 193. Cam 199 is preferably formed with a peripheral sector portion 188, having a radius substantially less than that of the remaining portions of cam 199 (FIG. 3).

A suitable actuating sleeve member 187 is preferably arranged in radial disposition upon a plane surface of cam 199 and secured thereto. It will thus be apparent that pivotal motion of sleeve 187, about the rotational axis 174 of cam 199, operates to rotate sector opening 188, of cam 199, to and from a position of registration with rod 231 of valve 193.

Figure 3:
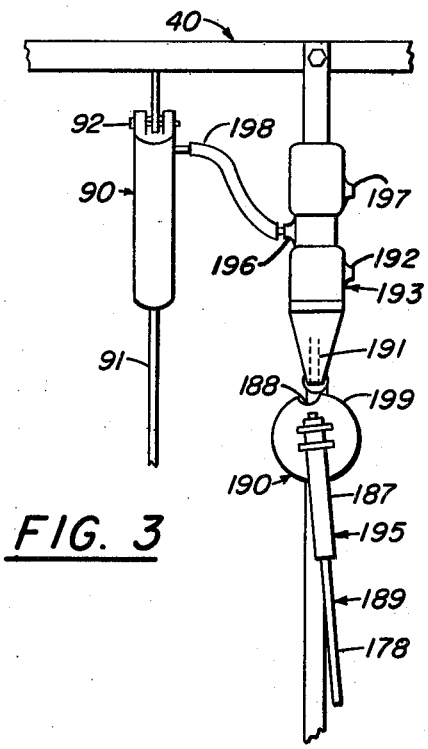
FIG. 3 is a view in enlarged, fragmentary section, taken along the line 3—3 of FIG. 2.

Cam rotating means 189 preferably comprises a slide-rod 178 (FIGS. 3 and 7). Rod 178 is pivotally connected, at its lower end, to tie shaft 46 (FIG. 7) of brush-suspending means 70, by terminal sleeve 179. The upper portion of rod 178 is slidably contained within sleeve 187 of cam 199.

It thus appears that when axis 41 of brush 44 is displaced from the substantially vertical plane of normal reciprocal motion, by a resistive force of extraordinary magnitude; linkage arms 71 and 75 are rotated about the axis of shaft 31 (FIG. 8) and operate to remove shaft 46 from the vertical plane of reciprocal motion. Shaft 46 thus operates to horizontally displace the lower terminus of rod 178, relative to frame 40. When this occurs rod 178 is rotated about axis 174, so as to rotate cam 199 through sleeve 187.

Rotation of cam 199, from the normal configuration of

FIG. 14 to the brush-retracting configuration of FIG. 3, operates to move piston 191 of valve 193 to the contained position of FIG. 3. When valve 193 is in the latter configuration, cylinder 93 is connected to conduit 231; through conduit 198, valve 193, and conduit 237 (FIG. 14). Such actuation of valve 193, at times when motor 33 and conduit 231 are energized by valve 290 from energy source 233, operates to energize and therefore actuate retracting motor 90.

Cam 199 and valve 193 (FIG. 3) are preferably so arranged that rod 189 may be rotated, about axis 174 of cam 199, within a pivotal sector of the order of 5°; without removing cam sector 188 from the normal operating position of registration with rod 191 of valve 193, shown in the diagram of FIG. 14. Such arrangement of actuating means 195 establishes acceptable operating limits for normal horizontal motion of axis 41 relative to frame portion 40. When thus arranged, means 190 will not actuate motor 90, in response to brush-resisting forces encountered in normal operation of the apparatus. However, when brush 44 encounters a resisting force of extraordinary magnitude; valve 193 is actuated, by cooperation of slide-rod 178 and cam 199, to energize motor 90, which then retracts brush 44 from a position of engagement with surface 18 to a position, substantially as shown in the dot-and-dash outline of FIG. 12.

Means 60 is provided, for frictionally engaging vertical surfaces 19 of vehicle 16 (FIG. 1). Vehicular engaging means 60 preferably comprises a vertically disposed brush 66 (FIG. 7); means 62, for pivotally connecting brush 66 to portion 69 of mobile frame 30; means 64, for displacing brush 66 between operative and inoperative positions; and means 67, connecting brush 66 in driven engagement with driving shaft 31, for rotating brush 66 about the axis of shaft 61.

Brush 66 is preferably formed integrally with an axial shaft 61, so as to be rotatable about the longitudinal axis of shaft 61. Means 62, for pivotally connecting brush 66 to mobile frame 30, preferably comprises: vertical drive shaft 63, rotatably secured to frame 30; and a plurality of horizontally disposed arms 202 and 208, journaled at their opposite ends to driving shaft 63 and axial shaft 61.

Vertical driving shaft 63 is rotatably supported at its lower end by a suitable thrust bearing 98, carried by vertical portion 69 of mobile frame 30 (FIG. 7). The upper end of shaft 63 is secured in driven engagement with a suitable angular shaft transmission 36; which is preferably secured to horizontal portion 40 of mobile frame 30. Transmission 36 is connected, by suitable belt drive means 68, in driven engagement with driving shaft 31.

Horizontal arm 208 is journaled adjacent its outer end upon vertical shaft 63, by a suitable bearing 209. A bearing 206 is located adjacent the opposite end of arm 208 and is carried thereby. Axial shaft 61 of brush 66 is rotatably supported at its lower end by bearing 206; and is journaled at its upper end by a suitable bearing 204, carried by upper horizontal arm 202. The outwardly disposed end of arm 202 is journaled upon driving shaft 63 by a suitable bearing 205.

It is thus apparent that brush 66 is rotatably secured within bearings 204 and 206, so as to be rotatable about the axis of shaft 61. The longitudinal axis of shaft 61 is retained substantially parallel to the axis of driving shaft 63, by arms 202 and 208 and associated bearing means. Since arms 202 and 208 are rotatably journaled upon shaft 63, it is apparent that the axis of shaft 61 is pivotably retained within a cylindrical plane, circumscribed about the axis of shaft 63; which in turn is rotatably secured at opposite ends to mobile frame 30, substantially in the manner previously described.

Means 64, for displacing brush 66 between an operative position, adjacent vehicle 16, and an inoperative position, located remotely from vehicle 16, preferably comprises: reciprocable fluid motor 210 and a suitable return spring substantially as described hereafter. Reciprocable motor 210 comprises a cylinder portion 212, secured by suitable pivotal means 213 to vertical portion 69 of mobile frame 30.

Cylinder 212 contains a suitable piston, carrying a connecting rod 214; which, in turn, is connected by a suitable shock spring 211 to a ring 216, provided upon arm 202 and located intermediate opposite bearings 204 and 205. The upper end of a suitable return spring is pivotally secured to vertical portion 69 of mobile frame 30, and the lower end is similarly connected to ring 216 of arm 202.

Motor 210 is preferably so arranged that the introduction of a pressurized fluid, from motor energizing system 230 (FIG. 14) through input conduit 217, operates to retract the piston and attached connecting rod 214, within cylinder portion 212 of motor 210; so as to rotate arms 202 and 208 about the axis of shaft 63, toward the substantially extended operating position of brush 66, illustrated in FIG. 7.

Means 67, for rotatably driving brush 66, comprises vertical drive shaft 63, sprockets 203 and 207, and chain 201, interconnecting said sprockets in driving engagement. Sprocket 203 is secured upon axial shaft 61, for rotation therewith. Sprocket 207 is secured upon driving shaft 63, for rotation therewith, substantially within the rotational plane of sprocket 203. Chain 201 is arranged upon sprockets 203 and 207 so as to transmit rotational motion of shaft 63 from sprocket 207 through sprocket 203 to axial shaft 61 and brush 66.

A second vertical brush means 50 is provided, for frictionally engaging the oppositely disposed vertical surfaces 17 of vehicle 16 (FIG. 1). Vertical brush means 50 is preferably constructed substantially similar to oppositely disposed vertical brush means 60, and is arranged in complementary configuration therewith. Brush means 50 is further arranged, in the apparatus of this invention, so that it may be rotatably driven by driving shaft 31 simultaneously with vertical brush 66 and horizontal brush 44.

Figure 13:
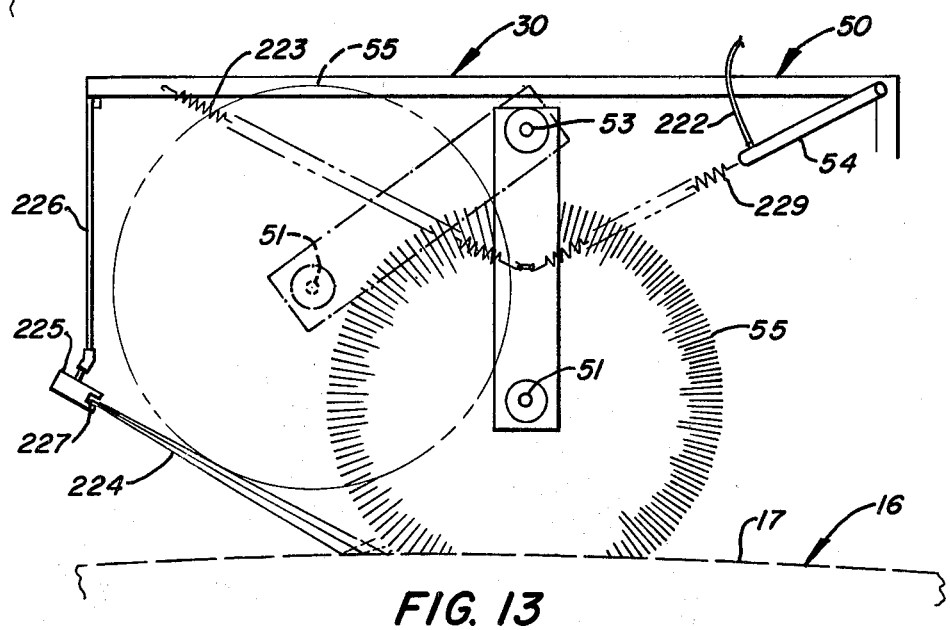
FIG. 13 is a diagrammatic representation of the relationship between the vertical brush element and a vertical surface of the vehicle of FIG. 1, during operation of the invention; the vehicle being indicated in broken outline, and a fully retracted, inoperative position of the vertical brush being shown in dot-and-dash outline.

By specific reference to the sectional view of FIG. 8, it is seen that brush means 50 comprises a vertically disposed brush 55; means 52, for pivotally connecting brush 55 to mobile frame 30; means 54, for displacing brush 55 between an operative position adjacent vehicle 16, illustrated in solid lines in FIG. 13, and an inoperative position located remotely from vehicle 16, substantially as shown in the dot-and-dash outline of FIG. 13; and means 57 (FIG. 8), connecting brush 55 in driven engagement with driving shaft 31, for rotatably driving brush 55.

Brush 55 is formed integrally with axial shaft 51 (FIG. 8) and is rotatable about the axis thereof, within oppositely disposed bearings, carried by upper and lower horizontal arms 52, which are pivotally secured to a vertical drive shaft 53; which in turn is rotatably secured to frame 30 and connected in driven engagement with angular shaft transmission 35 of horizontal frame portion 40. Transmission 35 is connected, by suitable belt drive means 58, in driven engagement with driving shaft 31, so as to be rotatable simultaneously with driving shaft 31 and vertical drive shaft 63 (FIG. 7).

Reciprocable motor 54 is connected between vertical frame portion 59 of mobile frame 30 and brush-repositioning means 52, by a suitable shock-absorbing spring 229. Motor 54 operates to bias brush 55 toward an extended position of frictional engagement with vehicle 16 (FIG. 13), at times when pressurized fluid is introduced into motor 54 through the actuating fluid conduit 222. When a differential fluid pressure, contained within the cylinder of motor 54, is relieved; axis 51 of brush 55 is returned to the retracted position, shown in the dot-and-dash outline of FIG. 13, by the inherent bias of tension spring 223.

Means, designated generally as 230 in the schematic diagram of FIG. 14, is provided in the invention, for energizing reversible motor 33 and reciprocable motor means 54, 64, and 90, each of which is previously described herein. Means 230 includes suitable energy source, for operating the driving and reciprocable motors and is symbolized in the diagram of FIG. 14 by energy input conduit 233.

Energy source 233 is preferably connected to a primary port 291 of a solenoid-operated selector valve 290, which is arranged for channeling energy, derived from source 233, through secondary port 292 to manifold 231; at times when solenoid valve 290 is energized substantially in the manner described hereafter. When valve 290 is in the de-energized state, energy source 233 is connected, by valve 290, directly to output conduit 194; and secondary ports 292 and 293 are interconnected in mutual communication.

Manifold 231 is connected, at one end, in communication with secondary port 292 of valve 290. The opposite termini of manifold 231 are connected in communication with actuating conduits 222 and 217 of reciprocable motors 54 and 64, respectively, and with primary port 175 of probe-actuated, motor reversing valve 170, and with primary port 197 of cam-actuated valve 193. Secondary ports of valve 170 are connected by conduits 176 and 177 to suitable internal circuits of motor 33; so as to selectively drive motor 33 in opposite directions, according to the longitudinal position of probe 171 of valve 170, substantially as previously described.

Output conduit 194 is in communication, at one end, with secondary port 294 of valve 290. The opposite end of conduit 194 communicates with primary port 192 of brush actuating selector valve 193 (FIGS. 3 and 14). When piston 191, of valve 193, is in the extended position of FIG. 14; primary port 197 of valve 193 is closed, and primary port 192 is connected in communication with secondary port 196. Repositioning piston 191 of valve 193 longitudinally within valve 193, by operation of cam 199 in the manner previously described, operates to close primary port 192 and to connect primary port 197 in communication with secondary port 196 and motor-actuating conduit 198.

A suitable fluid discharge head 225 (FIGS. 13 and 14) is preferably secured in fixed relationship with vertical portion 59 of mobile frame 30, substantially as shown in FIGS. 8 and 13. Lateral discharge head 225 is preferably constructed substantially as previously described in specific reference to discharge head 110 (FIG. 10). A suitable conduit 226, arranged in communication with output orifice 227 of discharge head 225, operates to supply fluids under pressure to head 225; at times when brush 55 is in the substantially extended configuration of FIGS. 8 and 13.

A plurality of discharge heads 225 is preferably located adjacent lateral brush 55 and carried by vertical frame portion 59. Discharge heads 225 are arranged upon vertical frame portion 59 for discharging a fluid film 224, which is preferably directed toward vertical surface 17 of vehicle 16 at an acute angle; so as to contact vehicular surface 17 along a vertical line lying adjacent brush 55 (FIG. 13). Discharge heads 225 are arranged in substantially vertical, spaced-apart configuration; so as to cooperate in delivering a unitary fluid film 224, which extends in substantially uninterrupted alignment throughout the vertical expanse of lateral surfaces 17 of vehicle 16.

A plurality of discharge heads 221 (FIGS. 7 and 14) is similarly arranged upon, and carried by, vertical frame portion 69. Discharge heads 221 are preferably spaced apart, in vertical array, substantially similar to discharge heads 225, and are located for discharging a fluid film along a vertical line adjacent lateral brush 66. Supply conduits 228 and 226 (FIG. 14) of discharge heads 221 and 225, respectively, are connected in common with supply conduit 49 of horizontally disposed discharge heads 110, to a suitable source of pressurized fluids.

Means, designated generally as 240 in FIG. 14, is provided for selectively supplying a variety of pressurized fluids to discharge heads 110, 221 and 225, in successively different combinations; according to a sequentially timed program, substantially as described hereafter. Fluid supply means 240 preferably includes a plurality of solenoid valve means 256, 257, 258 and 259; each of which is connected in communication with a source of a different fluid, at a pressure other than atmospheric. For example, the symbol 256 in FIG. 14, represents a solenoid-controlled source of pressurized liquid detergent; which is discharged through injector conduit 243 into fluid discharge conduit 241, at times when an included solenoid valve winding is energized by an electric current derived through spring 283 and contact 273 from line 269.

Symbol 257 in FIG. 14 represents a similarly pressurized source of a polarized wax material, presently available in fluid form; which is capable of being suspended in a water vehicle. The output of pressurized wax supply 257 is preferably controlled by an included solenoid valve means. When the solenoid winding of wax supply means 257 is energized by an electrical current, derived through conductor 287 from line 269; water-suspendable, polarized wax is discharged, in liquid form, from supply means 257 through wax-injector conduit 244.

Water supply means 258 is similarly controlled by an included solenoid-actuated valve means. When the solenoid winding of water supply means 258 is energized, by a current derived through conductor 288 from line 269, pressurized water is discharged through water conduit 245 into fluid discharge conduit 241.

Air supply means 259 is arranged substantially in the manner of the fluid supply means previously described. Air supply 259 is thus provided with an included solenoid-actuated output valve means, connected to electrical conductor 289 and line 279. When solenoid winding 259 is energized by an electrical current, pressurized air is discharged through air conduit 246 into fluid discharge conduit 241.

Fluid supply means 240 further includes a plurality of discharge head conduits 49, 228, and 226, previously mentioned; each of which is connected in fluid communication with fluid discharge conduit 241 and an associated group of discharge heads.

Means, designated generally as 250 in FIG. 14, is provided for selectively controlling the supply of successively different pressurized cleaning and drying fluids, from fluid supply means 256–259, inclusive, to fluid conduit 241; and for simultaneously controlling the transmission of operating energy from energy source 233 to motors 33, 54, 64 and 90, according to a predetermined, sequentially-timed program. Controlling means 250 preferably comprises a suitable programming device, designated generally as 260, in combination with associated electrical circuitry, substantially as shown in FIG. 14 of the drawings and described hereafter.

Programming means 260 preferably includes a suitable motor 255, arranged for rotating a plurality of cams 261, 262, 263, 264, 265 and 266; each of which is preferably secured in fixed engagement with a shaft 267, rotatably driven by motor 255. Cams 261 through 266, inclusive, are arranged upon shaft 267 so as to be rotatably operable; in accordance with a predetermined, sequentially-timed program, such as that illustrated in the diagram of FIG. 15 and described hereinafter, for example.

Cam 261 is arranged for periodically closing and opening an electrical circuit between contact 271 and spring terminal 281, in accordance with the predetermined program of motor 255. Cam 262 is similarly arranged for periodically making and breaking an electrical circuit between contact 272 and terminal 282. Cam 263 is positioned upon shaft 267, with reference to cams 261 and 262, so as to control an electrical circuit between contact 273 and terminal 283, according to a desired operating program.

Cam 264 is secured upon shaft 267 in a position, relative to other cam elements of programming means 260, so as to periodically make and break an electrical circuit between contact 274 and terminal 284, according to the controlling rotational program of motor 255. Cam 265 is similarly arranged for controlling an electrical circuit between contact 275 and terminal 285. Cam 266 is arranged to provide periodic control of an electrical circuit between contact 276 and terminal 286, in accordance with the same controlling program.

If desired, suitable switch means 251 may be provided in an element 268 of the electrical energy supply to controlling system 250. Switch 251 may be actuated by a coin-operable device of known configuration. If it is preferred, switch 251 may be of a pressure-actuated type, arranged to respond to positioning of a motor vehicle 16, subjacent track beams 21 and 23 (FIG. 1) of apparatus 20 of the invention.

Under circumstances where switch 251 is thus actuated by positioning vehicle 16 for cleaning purposes; a second switch 252 may be provided, if desired, in an element 278 of the controlling energy supply, and arranged to be actuated by deposit of monetary currency, such as a coin for example.

One side of the winding of programming motor 255 is connected to element 279 of the controlling energy supply. Electrical energy, available to the opposite side of motor 255, is preferably derived through a plurality of serially connected controlling elements, comprising: cam switch 261, substantially as previously described; and limit switch means 254, responsive to the location of mobile frame 30 upon frame-supporting means 25, for momentarily closing an electrical circuit between programming motor 255 and electrical supply line 269.

Limit switch 254 preferably has a normally-open configuration (FIG. 14) and is secured upon track means 25 (FIG. 1), so as to be momentarily actuated to a closed-circuit configuration, in response to engagement of switch 254 with mobile frame 30 at a predetermined instant, during each cycle of reciprocal travel of frame 30 upon track beams 21 and 23. For example, limit switch 254 may be so arranged, upon track beam 21, as to be momentarily closed, by engagement with mobile frame 30; substantially simultaneously with the actuation of reversing valve 170, which results from longitudinal repositioning of probe 171 upon contact of terminus 172 (FIG. 2) with transverse beam 22 of supporting frame 25, as previously described.

Contact 272 of cam switch 262 is so connected to the actuating winding of solenoid-operated motor selector valve 290 that secondary ports 293 and 294 will be closed, and primary port 291 and secondary port 292 will be in mutual fluid communication; at times when cam switch 262 is in the closed-circuit configuration, which operates to energize valve 290. Cam switch 263 operates to control the supply of actuating electrical energy from line 269 to the output-actuating winding of detergent supply system 256; so as to cause liquid detergent to be discharged from supply 256 through injector conduit 243 to fluid discharge conduit 241, at times when switch 263 is in the closed-circuit configuration.

Cam switch 264 operates to control a supply of electrical energy from line 269 to switch means 253, which is connected in series with an actuating valve winding of wax supply means 257. Switch 253 is preferably of the coin-actuated type, having a normally-open circuit configuration. Switch 253 is placed in a closed-circuit configuration by the deposit of a coin or similar currency. When switch 253 is thus closed and cam switch 264 is rotated by motor 255 to its closed-circuit configuration, output valve winding 257 is energized; and water-suspendable, liquid wax is discharged through injector conduit 244 into fluid delivery conduit 241.

Cam switch 265 is arranged to periodically close an electrical circuit between line 269, for energizing output valve winding 258, so as to discharge pressurized water through water conduit 245 into fluid delivery conduit 241. Cam switch 266 operates to close an electrical circuit from line 269, so as to energize air supply valve 259, for discharging air under pressure through air conduit 246 into fluid delivery conduit 241.

Operation

In the operation of a preferred embodiment of this invention, as described herein, apparatus 20 is arranged substantially in the configuration illustrated in FIG. 1. Mobile frame 30 is thus positioned immediately adjacent forward tie-beam 22, and limit probe 171 of reversing valve 170 is located in the rearwardly projecting position, shown in FIG. 2. Shaft 267 of programming motor 255 is preferably adjusted to a position wherein cams 261–266, inclusive, are arranged to provide the control characteristics indicated along the vertical index, labeled "Pulse 1" in the diagram of FIG. 15.

When programming means 250 is thus adjusted to the configuration required for the program of FIG. 15, cam switch 261 is closed and cams 262–266, inclusive, are each in their respective open-circuit configurations. Since mobile frame 30 is in its forwardmost position, upon support means 25, as seen in FIG. 2; the normally-open limit switch 254 (FIGS. 1 and 14) is in physical contact with mobile frame 30. Switch 254 is thereby maintained in a closed-circuit configuration. Thus an electrical circuit is completed between controlled line 269 and one side of the winding of programming motor 255.

Since the vehicle-actuated switch 251 and coin-actuated switch 252 are both in their normally-open, stand-by configurations; no electrical circuit is completed to the winding of programming motor 255 and the apparatus remains in the stand-by state, ready for operation upon demand. It will be understood that supply conduit 233 is preferably connected to a suitable source of compressed air and fluid supply systems 256–259, inclusive, are each pressurized, as previously described, and ready for appropriate service upon demand; at times when the apparatus of the invention is thus maintained in the stand-by state. Under stand-by conditions, valves 193 and 290 (FIG. 14) are so positioned that energy, derived from conduit 233 is channeled through conduit 194 and 198 to energize lift motor 90; so as to maintain horizontal brush 44 in the retracted position of FIG. 12.

With apparatus 20 of FIG. 1 in the stand-by state, a vehicle 16 may be driven directly to the position of vehicle 16 in FIG. 1, subjacent the superposed track means 25. Such positioning of vehicle 16 operates to close the vehicle-actuated switch 251, creating an electrical circuit from line element 268 to controlled line 269, and through limit switch 254 to one side of the energizing winding of programming motor 255.

A deposit of currency, in coin-actuated switch 252, operates to close an electrical circuit between line element 278 and controlled line 279; which completes the electrical circuit through the winding of programming motor 255, causing the motor to rotate shaft 267. Cams 261–266, inclusive, are rotated by shaft 267 and operate to selectively control their respective electrical circuits; according to a preselected program, substantially as illustrated in the diagram of FIG. 15.

As shaft 267 advances cam 262 to that point in the control program, designated as 301 in FIG. 15; an electrical circuit is completed between contact 272 and spring terminal 282, which energizes selector valve 290. When valve 290 is thus energized, the stand-by fluid circuit from energy source 233, through conduits 194 and 198, to reciprocable motor 90 is interrupted; and conduit 194 is connected by valve 290 in communication with exhaust port 293, causing lift motor 90 to become de-energized.

When the internal pressure from cylinder 93 of motor 90 is thus relieved, through conduit 198, valve 193, conduit 194, valve 290 and exhaust port 293; lever arm 87 (FIG. 7) is rotated gravitationally about shaft 83, to the horizontal brush extending position shown in solid lines in FIG. 7. Coincidentally with de-energization of lift motor 90, valve 290 operates to connect compressed air source 233 to driving energy conduit 231. This operation energizes lateral brush positioning motors 54 and 64; which operate, in the manner previously described, to rotate oppositely disposed lateral brush positioning arm means 52 and 62, about their respective pivotal axes 53 and 63, toward laterally extended operating positions, as illustrated in FIG. 13.

Introduction of pressurized fluid to motor conduit 231 (FIG. 14) also serves to supply operating energy to input port 175 of limit valve 170; whereby energizing fluid is channeled to the appropriate internal circuit of drive motor 33, determined by the longitudinal position of valve-actuating probe 171. Since mobile frame 30 is in the forward position of FIG. 2, under stand-by conditions; probe 171 is in the corresponding rearwardly disposed location, as previously described, and valve 170 is thereby positioned for energizing that internal circuit of motor 33 which operates to rotatably drive motor 33, transmission 34, shaft 31 and friction wheel 141 in the clockwise direction (in FIG. 6).

All other elements, rotatably driven by drive shaft 31, are simultaneously driven in a direction corresponding to clockwise rotation of drive shaft 31 in FIG. 6. Friction pulleys 141 and 142 are thus rotated, by shaft 31, in contact engagement with track beam 23; so as to frictionally propel frame 30, along support means 25, in a direction away from tie-beam 22.

As mobile frame 30 is thus moved from the stand-by position of frictional engagement with limit switch 254, the limit switch is restored to the normally-open configuration of FIG. 14. However, reference to FIG. 15 reveals that cam 261 is so positioned upon shaft 267 that spring terminal 281 and contact 271 are maintained in a closed-circuit configuration from the initiation of an operating program, at program point 302, through a program interval which terminates at point 303, after the start of closed contact intervals at points 304 and 305, by cam switches 263 and 265, respectively.

Thus cam switch 261 operates to hold the electrical circuit between controlled line 269 and the motor winding, so as to sustain operation of programming motor 255 throughout a time interval, which continues beyond initiation of the first drive-energy cycle at point 301 and subsequent interruption of the electrical circuit of limit switch 254.

Substantially coincidental with initiation of the drive-energy cycle at 301 (FIG. 15), motor 255 rotates shaft 267 so as to close switches 263 and 265 at program points 304 and 305, respectively. Cam 265 thus operates to close an electrical circuit from controlled line 269, through contact 275 and spring terminal 285, for energizing the water-supply solenoid 258; thus permitting discharge of pressurized water, through conduit 245 to delivery conduit 241 and fluid discharge heads 110, 221, and 225 (FIG. 14).

Cam switch 263 operates in a similar manner, at program point 304 (FIG. 15), to establish an electrical circuit from controlled line 269 through contact 273 and spring terminal 283; so as to energize detergent supply solenoid 256, and discharge fluid detergent, through injector conduit 243 into pressurized water, which is simultaneously discharged through conduit 241 and discharge heads 110, 221, and 225, by operation of cam switch 265.

After cam switches 262, 263 and 265 are thus rotated to their respective closed-circuit configurations, programming motor 255 continues to rotate shaft 267 until the operating time period of cam 261, represented by the shaded portion 302–303 of the diagram of FIG. 15, is terminated at point 303. At program point 303, cam switch 261 operates to disconnect the electrical circuit between contact 271 and spring 281.

Since mobile frame 30 is not in physical engagement with limit switch 254, at this point in the operating cycle, limit switch 254 is in its normally-open circuit configuration. Therefore, rotation of cam 261 to an open-circuit configuration, at time interval 303, operates to terminate the flow of operating energy from controlled line 269 to motor winding 255. When the operation of programming motor 255 is thus interrupted by cam switch 261, cams 262, 263, and 265 are in their respective closed circuit configurations; in which mode they each remain, until the start of the next successive operating cycle of programming motor 255.

Thus driving motor 33 continues to rotate shaft 31 so as to propel mobile frame 30 along track beams 21 and 23 toward rear tie-beam 24. Lateral brush positioning motors 54 and 64 remain energized, and continue to maintain lateral brushes 55 and 65 in the extended position illustrated in FIG. 13, wherein the brushes are in frictional engagement with vertical surfaces 17 and 19 of vehicle 16 (FIG. 1).

Lift motor 90 (FIG. 7) is de-energized. Therefore, horizontal brush 44 is in the gravitationally extended position of FIG. 12 and in contact engagement with an upwardly disposed surface 18 of vehicle 16.

Rotation of driving shaft 31, by motor 33, is transmitted by drive means 68 and 36 (FIG. 7) to vertical drive shaft 63, and operates, through drive chain 201, to rotatably drive vertical brush 66. The rotary motion of shaft 31 is similarly transmitted, through drive means 58, vertical shaft 53, and angle transmission 35, and chain means 57 to simultaneously rotate the oppositely disposed vertical brush 55 (FIG. 8). At the same time, rotary motion of shaft 31 is transmitted, by horizontal brush driving means 180 (FIG. 7) to axial shaft 41, for rotation of horizontal brush 44, simultaneously with vertical brushes 55 and 56.

The closing of cam switches 263 and 265 operates to deliver a pressurized detergent fluid solution through conduits 49, 228, and 226, respectively, to discharge heads 110, 221, and 225 (FIGS. 7 and 8). Each battery of discharge heads operates simultaneously in the manner previously described, to direct a unitary, pressurized fluid film upon a display surface of vehicle 16, substantially along predetermined, transversely extending lines of impact, as previously described herein.

As mobile frame 30 is propelled, by means 130, toward rear tie-beam 24 of support means 25 (FIG. 1), the simultaneously rotating brushes 44, 55, and 66 cooperate with the horizontally aligned fluid film 124, and oppositely disposed, vertically aligned, fluid films 224, to abrade and buff display surfaces 17, 18 and 19 of vehicle 16; so as to dislodge accumulated contaminants, regardless of their solubility characteristics.

Brushes 44, 55 and 66 and fluid films 124 and 224 are maintained in continuous frictional engagement with vehicle 16, during the operating period of drive motor 33. Therefore, the abrading and buffing action of associated brushes and fluid films is substantially continuous, during the period of travel of frame 30 throughout the longitudinal reaches of vehicle 16. Thus brushes 44, 55 and 66 and fluid films 124 and 224 are brought by frame 30, into physical engagement with substantially all display surfaces 17, 18 and 19 of vehicle 16; during each period of travel of frame 30, between forward beam 22 and rearward beam 24 in FIG. 1.

When brush 44 is thus drawn toward a horizontal vehicular surface 18, which is disposed in a substantially different plane than that with which brush 44 is then engaged; the back-pressure, resulting from impact of fluid film 124 with the prospective surface 18, is transmitted to brush-suspending means 70, in the manner previously described. The resultant reactive force then operates to reposition brush 44 so that axis 41 will be maintained in substantially the same proximate relationship with the new surface 18, as was maintained adjacent the previously encountered surface 18, located in a substantially different plane.

When mobile frame 30 approaches rear tie-beam 24 of support means 25; the rearward terminus 173 of limit probe 171 (FIG. 2) engages beam 24. Limit valve 170 is then repositioned rearwardly along probe 171, by further motion of mobile frame 30. Probe 171 is thus repositioned, forwardly within valve 170, to the configuration represented in FIG. 14; wherin valve 170 operates to channel driving energy from conduit 231 to that internal circuit of motor 33 whereby shaft 31 is rotatably driven in a counterclockwise direction as viewed in FIG. 6.

Thus the direction of motion, of mobile frame 30 upon support means 25, is reversed; and frame 30 is thereafter propelled by means 130 toward forward tie-beam 22 (FIG. 1). Reversal of the operating mode of motor 33 is attended by no change in the pre-existing operating modes of brush positioning motors 54, 64 and 90, programming motor 255, water supply solenoid 258 and detergent supply solenoid 256.

As mobile frame 30 approaches forward tie-beam 22, it is brought into frictional engagement with limit switch 254 (FIGS. 1 and 14); which operates to close switch 254 at the program instant designated by the "Pulse 2" index, in the diagram of FIG. 15. When limit switch 254 is thus closed, it operates to energize programming motor 255 (FIG. 14) so as to advance shaft 267 and all associated cams. Thus cam switch 262 is rotated to the closed-circuit configuration, which operates to maintain programming motor 255 in the energized state, after subsequent motion of frame 30 reopens the circuit of limit switch 254.

Cam 263 is rotated by motor 255 to the open-circuit configuration, designated at point 306 in the programming diagram of FIG. 15. Motor drive energy cam 262 may, if desired, be simultaneously advanced to a momentarily off interval 307–308, in order for the force of impact between frame 30 and limit switch 254 to be minimized. Water cam switch 265 preferably remains in the closed-circuit configuration, through the travel-reversing operation, which occurs simultaneously with limit switch "Pulse 2."

Engagement of terminus 172 of probe 171, with forward beam 22 (FIG. 1) operates to reverse the direction of travel of frame 30 upon support 25, and the direction of simultaneous rotation of brushes 44, 55 and 66; substantially in the manner previously described. Advancement of cam 262 (FIG. 14) to program position 308 (FIG. 15) operates to start the second cycle of reciprocal travel of frame 30, longitudinally of track means 25.

Throughout the second travel cycle, water cam switch 265 remains closed. Brushes 44, 55 and 66 cooperate with fluid films 124 and 224, substantially in the manner previously described, so as to rinse detergent solution and dislodged contaminants from display surfaces 17, 18 and 19 of vehicle 16.

When frame 30 subsequently engages limit switch 254, a third cycle of reciprocal travel is initiated by the occurrence of limit switch "Pulse 3" in the program diagram of FIG. 15. Water cam switch 265 remains closed throughout the third cycle of reciprocal travel of mobile frame 30. Limit switch "Pulse 3" operates to rotate the "wax" programming cam 264 to the closed-circuit configuration indicated at 310 (FIG. 15).

The operational effect of closing the electrical circuit between contact 274 and spring 284 (FIG. 14) is dependent upon the position of the coin-actuated "wax" switch 253. Under circumstances where an operator of the apparatus desires application of a polarized wax finish to vehicle 16; he deposits a coin which operates to position switch 253 in the closed-circuit configuration, prior to initiation of the third cycle of reciprocal travel of frame 30.

Coin-actuated switch 253 is of known configuration, and is so arranged that it remains closed, after actuation, until released by the subsequent occurrence of limit switch "Pulse 4." When switch 253 is thus in the closed position, at the occurrence of "Pulse 3;" subsequent completion of the circuit of cam switch 264 operates to energize solenoid 257 (FIG. 14). Energization of solenoid 257 operates to discharge polarized wax, in liquid form, through injector conduit 244 into the pressurized water, which is simultaneously being delivered through conduit 241 from water supply means 259.

If coin-actuated switch 253 is not in the closed position, as described above, at occurrence of "Pulse 3" in FIG. 15; the apparatus operates to discharge rinsing water only, during the program period designated as "WAX" in FIG. 15.

Limit switch "Pulse 4" operates to advance water cam switch 265 to an open-circuit configuration; thus closing solenoid valve 258 and terminating the delivery of pressurized water to conduit 241, at program point 311 in FIG. 15. Continued operation of program motor 255 under control of cam switch 261, during program interval 312, rotates air cam switch 266 to the closed circuit configuration, indicated at program point 313 in FIG. 15.

Closing the circuit of cam switch 266 operates to energize air supply solenoid 259; whereby pressurized air is discharged through conduits 246 and 241 to conduits 49, 226 and 228 of fluid discharge heads 110, 225 and 221, respectively. During the reciprocal travel cycle 314 of frame 30, which occurs during the program interval designated "DRY" in FIG. 15; a fluid film of pressurized air is thus simultaneously delivered by discharge heads 110, 221 and 225 throughout display surfaces 17, 18 and 19 of vehicle 16.

The physical characteristics of fluid films, discharged by heads 110, 221 and 225, as previously described, result in removal of substantially all liquids from the display surfaces of vehicle 16; during the course of a single cycle of reciprocal travel of frame 30 upon support means 25. This result occurs because of the abrading effect of the impact of fluid air films 124 and 224; which operate to dislodge liquid residues from substantially all display surfaces of vehicle 16, independently of the rate of evaporation of such residues.

The discharge of pressurized air, from source means 259 through delivery conduit 241, supply conduits 49, 222 and 228 and discharge heads 110, 221 and 225, operates to effectively purge those structural elements of substantially all fluid residues, as a concluding step in operation of the apparatus. Thus, when apparatus 20 is operated under ambient temperature conditions, which are conducive to freezing; the risk of damage to the apparatus, by freezing of liquid residues, is substantially minimized.

When mobile frame 30 completes the reciprocal cycle 314 of travel upon frame 25, during the program period designated "DRY" in the diagram of FIG. 15, and re-engages limit switch 254 at "Pulse 5"; program motor 255 is again energized, in the manner previously described. During the time period of program interval 315, motor 255 rotates shaft 267 and each of cams 261–266, inclusive, to their respective open-circuit configurations, substantially as indicated at program point 316 in FIG. 15.

Thus programming means 250 and apparatus 20 are restored to their original stand-by condition, ready for a successive cleaning operation. Vehicle 16 may then be driven from the position of FIG. 1 to make way for the vehicle of the next succeeding user of apparatus 20.

The program time interval which elapses between each of the successively numbered limit switch pulses, as diagramed in FIG. 15, comprises one complete cycle of reciprocal travel of mobile frame 30, longitudinally of support means 25. Thus it is seen that each of such cycles consists in: (a) mechanical engagement of limit switch 254, of frame 25, by mobile frame 30 (FIG. 1); (b) repositioning of reversing valve 170, (FIG. 14) by physical engagement of probe 171 and forward beam 22 (FIG. 1); (c) propelling frame 30, by means 130, from the forwardly disposed solid-line position to the rearwardly disposed position upon frame 25, shown in broken outline in FIG. 2; (d) repositioning of valve 170 by engagement of terminus 173 of probe 171 (FIG. 2) and tie-beam 24 of FIG. 1, so as to reverse the direction of drive of motor 33 (FIG. 14); (e) propelling of frame 30 upon track 25, by propelling means 130, from rearward tie-beam 24 toward forward beam 22; and (f) re-engagement of limit switch 254 by mobile frame 30, which operates to generate limit switch "Pulse 2" in FIG. 15 and to initiate a subsequent cycle of reciprocal travel of mobile frame 30.

During each such cycle of reciprocal travel of frame 30 upon track 25; brushes 44, 55 and 66 are maintained, by brush displacing means 80, 54 and 64, respectively, in contact engagement with display surfaces 18, 17 and 19 of vehicle 16; by operation of valve 290, which is energized through cam switch 262 (FIG. 14), in accordance with the program of FIG. 15. Operation of cam switches 263–266, inclusive, according to the predetermined program of FIG. 15; results in successive delivery of fluid films 124 and 224 (FIGS. 12 and 13) from discharge heads 110, 221 and 225, contemporaneously with each cycle of reciprocal travel of frame 30 upon track 25.

The relative composition of fluid films 124 and 224, during each successive cycle of reciprocal travel of frame 30, is determined by the relative positions of cams 263 through 266, upon shaft 267 of programming means 250. While the relative positions of cams 261 through 266 may be varied to provide a variety of desired operating programs; means 250 is preferably arranged in the configuration previously described, so as to provide a sequence of operations substantially as illustrated in FIG. 15 and described herein.

At times when brush 44 is maintained by brush displacing means 80 (FIG. 7) in the extended position of FIG. 12, and mobile frame 30 is reciprocally propelled upon track 25 (FIG. 1); the motion of brush 44, relative to track 25 and stationary vehicle 16, is resisted by a nominal degree of frictional drag, which results from contact engagement between brush 44 and surfaces 18 of vehicle 16. It is pointed out above that cam 195 of release valve 193 (FIG. 14) is preferably formed, so as to permit normal drag resistance, which results when brush 44 is drawn by frame 30 across surfaces 18 of vehicle 16, in normal frictional engagement therewith, without actuating valve 193 from the extended configuration of FIG. 14.

In the event that the extended brush 44 encounters a substantial obstacle to such travel, such as a luggage rack, extended antenna, vehicular roof display, or warning siren, for example; the resulting increase in frictional drag operates to cause the rate of linear motion of brush 44 to lag with reference to the rate of movement of frame portion 40 of frame 30, transversely of FIG. 12. Such an occurrence operates to simultaneously rotate rod 178 about the axes of tie shaft 46 and pivot 174 of cam 199 (FIG. 7); and thus to change the angular relationship between rod 178 and the pivotal axis of cam 199 in FIG. 3.

Such a change in the radial disposition of rod 178, with respect to cam 199, is transmitted to sleeve 187, within which rod 178 is slidably contained. Since sleeve 187 is secured in radial disposition with cam 199, pivotal motion of rod 178, in a degree exceeding that which results from normal frictional drag, operates to rotate cam 199 to a position, wherein sector opening 188 is out of registration with piston rod 191 of emergency brush retracting valve 193.

Thus an abnormal degree of pivotal motion of rod 178 operates, through sleeve 187 and cam 199, to move rod 191 longitudinally of valve 193; from the exhausting configuration of FIG. 14 to the motor-energizing configuration of FIG. 3. In the configuration of FIG. 3, primary port 192 of valve 193 is closed; and primary port 197 is connected in fluid communication with secondary valve port 196.

When valve 193 is thus positioned, by operation of brush retracting rod 178; compressed air, derived from source 233 (FIG. 14), passes from manifold 231 through conduits 217 and 237, ports 197 and 196 of valve 193, and conduit 198, and operates to energize brush-retracting motor 90, by driving piston 91 toward the extended configuration indicated by broken lines in FIG. 7. Piston 91 of lift motor 90 thus operates to rotate arm 81 about the axis of shaft 83, to the substantially horizontal position, depicted in the broken outline of FIG. 7.

Arm 81 carries sector portion 151, which is thus rotated, in a clockwise direction in FIG. 4, so as to bring face 161 into engagement with face 163 of lever sector 155. Rotation of sector 155 operates to rotate the attached lever arm 87, from the horizontal position of FIG. 7 to the substantially vertical position of arm 87, shown in broken outline.

When arm 87 is thus rotated toward the vertical position, cable 89 is drawn upwardly across guide pulley 97. Since the lower terminus of cable 89 is pivotally connected to tie shaft 46 of brush suspending means 70; upward movement of cable 89 in FIG. 7 operates to elevate tie shaft 46, drawing the lazy-tongs structure of suspension means 70 toward the retracted configuration shown in the dot-and-dash outline of FIG. 12.

In the retracted position of FIG. 12, brush 44 is disengaged from frictional contact with vehicle 16. If desired, suitable means (not shown) may be provided for terminating operation of apparatus 20 at times when valve 193 is thus actuated by rod 178; until such time as the drag-inducing obstruction is removed from the environment of apparatus 20.

When the operation of apparatus 20 is discontinued, by operation of programming means 250 or otherwise; horizontal brush 44 is elevated to the retracted position of FIG. 12, by brush-retracting means 80, substantially as previously described. Brush 44 is preferably retained in the retracted position, under circumstances of stand-by conditions.

Lateral brush extending motors 54 and 64 (FIG. 14) are de-energized; and lateral brush-return springs 233 operate to rotate lateral brush positioning means 52 and 62, about their respective pivotal axes 53 and 63 (FIGS. 7 and 8); to retracted positions, substantially as indicated by the dot-and-dash outline of FIG. 13.

From the foregoing description it will be apparent that apparatus 20 of this invention operates to clean exterior surfaces 17, 18 and 19 of a vehicle 16, without movement of vehicle 16 during the cleaning process. Since all vehicular engaging elements of apparatus 20 are carried by mobile frame 30, in suspended relationship with track means 25, and are thus arranged in superposed relationship with vehicle 16; the area of environment of vehicle 16, located subjacent apparatus 20, is without essential obstruction to vehicular and pedestrian traffic.

Fluid films 124 and 224 are formed and projected by discharge heads 110, 221 and 225, in the configuration of a substantially unitary sheet of fluid material. Therefore, apparatus 20 operates to form and direct fluid films 124 and 224 into impact with all reaches of vehicular surfaces 17, 18 and 19, with substantially minimized evaporation and heat loss characteristics.

Fluid films 124 and 224, discharged by heads 110, 221 and 225, are carried by frame 30 throughout the longitudinal reaches of vehicle 16, and programming means 250 operates to deliver sequentially-timed quantities of detergent, polishing and drying fluids to discharge heads 110, 221 and 225. Therefore, apparatus 20 operates to uniformly scrub exposed surfaces 17, 18 and 19 of parked vehicle 16, simultaneously with successive applications of detergent, polishing and drying fluids, derived from supply means 256, 257 and 259, respectively.

The arrangement of cams 261 through 266, of programming means 250, determines the time sequence of delivery of differently characterized fluids to discharge heads 110, 221 and 225; and means 250 is actuated by an energy signal, delivered by switch means 251 and 252. It is thus apparent that apparatus 20 responds to an actuating signal by delivering sucessively different fluids to display surfaces of vehicle 16, according to the predetermined, sequentially-timed program of FIG. 15.

Apparatus 20 of the invention may be operated so as to rapidly remove surface contaminants from an irregularly formed object, such as a vehicle 16, for example, according to a method which comprises the steps: (a) simultaneously applying a plurality of scouring means 44 and 110 to an irregularly formed surface 18 of vehicle 16; and (b) moving said plurality of scouring means transversely of surface 18, so as to exercise a substantially uniform abrading effect throughout a variety of planes occupied by surface 18.

It is to be understood that the example of the apparatus of this invention, shown and described herein, is selected for purposes of illustration only. The invention is not to be construed as limited to particular forms thus illustrated. Various changes, modifications, and substitution of elements may be made therein, without departing from the spirit and scope of the invention.

I claim:

1. Apparatus for cleaning an object, comprising: a frame, positionable adjacent said object; means, comprising a brush, arranged in articulated relationship with said frame, for frictionally engaging said object; means for retractably suspending said brush from said frame; and means, comprising a fluid discharge head connected to said brush, for maintaining a substantially constant degree of frictional engagement between said brush and said object.

2. Apparatus for cleaning a stationary object, comprising: a mobile frame; means, rotatable about a movable axis, for frictionally engaging said object; means, carried by said frame, for retractably suspending said engaging means from said frame; means, located upon said frame, for displacing said axis between extended and retracted positions; means for rotating said engaging means about said axis; means comprising a fluid discharge head carried by said suspending means, for maintaining said axis in predeterminable spaced relationship with said object, at times when said engaging means is located adjacent said object; and means, for moving said frame transversely of said object.

3. The apparatus of claim 2, wherein said suspending means comprises a series of jointed bars, pivotally secured to said frame and rotatably carrying said brush.

4. The apparatus of claim 2, in further combination with means, for supplying pressurized fluid to said discharge head means.

5. The apparatus of claim 4, wherein said fluid supply means is operable for selectably varying the composition of delivered fluids.

6. The apparatus of claim 2 in further combination with means, comprising a track, for guiding movement of said frame transversely of said object.

7. The apparatus of claim 6, wherein said track means comprises a plurality of beam members, arranged in spaced-apart configuration.

8. The apparatus of claim 6, wherein said track means is arranged superjacent said object.

9. The apparatus of claim 6, wherein said frame moving means includes a pulley, so arranged as to be frictionally engageable with said track.

10. The apparatus of claim 6, wherein means is provided for reversing the direction of motion of said frame upon said track, at predeterminable intervals.

11. The apparatus of claim 2 in further combination with means, for removing said engaging means from a position of frictional engagement with said object, at times when transverse motion of said engaging means is resisted by a force of extraordinary magnitude.

12. The apparatus of claim 2, in further combination with means, comprising a second brush rotatable about an axis, angularly disposed with reference to said first axis, for frictionally engaging a second surface of said object.

13. The apparatus of claim 12, wherein means is provided for rotating said second brush about said angularly disposed axis.

14. The apparatus of claim 12, wherein means is provided, for biasing said second brush toward a position of frictional engagement with said object, at times when desired.

15. Apparatus for cleaning a stationary object, comprising: a mobile frame; a drive shaft, journaled in said frame; means, comprising a motor connected to said shaft, for rotatably driving said shaft; means, comprising a brush rotatable about a movable axis, for frictionally engaging a surface of said object; means, connecting said brush and said drive shaft, for rotatably driving said brush; means, comprising a fluid discharge head, for maintaining said rotational axis in a substantially constant spaced-apart relationship with said surface, at times when said axis is located adjacent said object; and means, for moving said frame transversely of said object, at times when said axis and said surface are in said spaced-apart relationship; and means, for displacing the rotational axis of said brush away from said object, at times when desired.

16. Apparatus for cleaning a movable object, comprising: a track; a mobile frame, supportable upon said track adjacent said object; a plurality of wheels, journaled in said frame and engageable with said track; means, for rotatably driving one of said wheels; means, comprising a brush rotatable about an axis, for frictionally engaging a surface of said object; means, comprising a series of articulated bars, for suspending said brush in retractable relationship with said frame; means, for biasing said brush away from a position of engagement with said object at times when desired; means, for rotating said brush about said axis; means, comprising a fluid discharge head connected to said brush, for extruding a fluid film into engagement with said object, so as to maintain said axis in predetermined spaced relationship with said object at times when said brush is in engagement with said object; and means, for supplying a fluid material to said discharge head, at times when said brush is in engagement with said object.

17. Apparatus for cleaning a vehicle, comprising: a track, arranged superjacent said vehicle and extending longitudinally thereof; a mobile frame, supportable upon said track; a plurality of wheels journaled in said frame and engageable with said track; means, comprising a motor-driven shaft journaled upon said frame, for rotatably driving one of said wheels; means, comprising a brush, rotatable about a substantially horizontal axis, for frictionally engaging a surface of said vehicle; means, comprising a series of articulated bars pivotally connected to said frame and journaling said horizontal brush, for suspending said brush in extensible relationship with said frame; means, comprising a reciprocable motor, for biasing said brush away from a position of engagement with said vehicle at times when desired; means, connecting said shaft and said brush, for rotating said brush about said axis; means, comprising a second brush rotatable about a substantially vertical axis, for engaging another surface of said vehicle; means, comprising a second reciprocable motor, for biasing said vertical brush toward a position of engagement with said vehicle, at times when desired; means, connecting said vertical brush to said shaft, for rotating said vertical brush; means, comprising a fluid discharge head connected to one of said brushes, for extruding a fluid film into reactionary impact with said vehicle, so as to maintain the rotational axis of said one brush in predeterminable spaced relationship with said vehicle, at times when said one brush is in frictional engagement with said vehicle; and means, for alternately supplying cleaning and drying fluids to said discharge head means, at times when said one brush is in frictional engagement with said vehicle, according to a predeterminable time program.

18. The apparatus of claim 1, in further combination with track means, for supporting said frame in superposed relation with said object; and means, comprising a rotationally driven pulley in contact engagement with said track means, for frictionally propelling said frame longitudinally of said supporting track means.

19. The apparatus of claim 18, in further combination with additional means, for removing said brush from frictional engagement with said object, at times when movement of said brush is resisted by an opposing force of predeterminable magnitude.

20. The apparatus of claim 1, wherein said fluid discharge head comprises, in combination: a base portion, an interval spacing diaphragm, and a cap portion; cooperatively defining a central cavity in communication with a radially extending discharge duct.

21. The apparatus of claim 1, in further combination with means, for supplying fluid under pressure to said discharge head means.

22. The apparatus of claim 21; in further combination with means, for selectively varying fluids supplied to said discharge head means.

23. The apparatus of claim 22; in further combination with means, for operating said selectively variable means according to a sequentially timed program.

References Cited

UNITED STATES PATENTS 3,187,359 6/1965 Takeuchi.
3,278,962 10/1966 Christ.
3,304,565 2/1967 Fuhring.
3,323,228 6/1967 Maxwell.

EDWARD L. ROBERTS, Primary Examiner

U.S. Cl. X.R.

134—123; 239—592